(12) United States Patent
Jacobsen et al.

(10) Patent No.: US 8,942,846 B2
(45) Date of Patent: Jan. 27, 2015

(54) SYSTEM AND METHOD FOR CONTROLLING A TELEOPERATED ROBOTIC AGILE LIFT SYSTEM

(75) Inventors: Stephen C. Jacobsen, Salt Lake City, UT (US); Fraser M. Smith, Salt Lake City, UT (US); Marc X. Olivier, Salt Lake City, UT (US); Shane Stilson, Bountiful, UT (US)

(73) Assignee: Raytheon Company, Waltham, MA (US)

( * ) Notice: Subject to any disclaimer, the term of this patent is extended or adjusted under 35 U.S.C. 154(b) by 270 days.

(21) Appl. No.: 13/332,152

(22) Filed: Dec. 20, 2011

(65) Prior Publication Data

US 2013/0011220 A1 Jan. 10, 2013

Related U.S. Application Data

(60) Provisional application No. 61/481,103, filed on Apr. 29, 2011, provisional application No. 61/481,110, filed on Apr. 29, 2011, provisional application No. 61/481,089, filed on Apr. 29, 2011, provisional (Continued)

(51) Int. Cl.
*G06F 19/00* (2011.01)
*B25J 9/16* (2006.01)

(Continued)

(52) U.S. Cl.
CPC ............ *B25J 9/0084* (2013.01); *B25J 9/1689* (2013.01); *B66C 13/44* (2013.01); *B25J 5/005* (2013.01); *B25J 3/04* (2013.01); *B66C 1/425* (2013.01); *B25J 13/025* (2013.01)
USPC ........... 700/245; 700/247; 700/258; 700/262; 700/264

(58) Field of Classification Search
CPC ............................... B25J 3/04; G05B 19/427
USPC .......... 700/245, 247, 258, 262, 264; 901/1, 2, 901/3, 6, 8, 14, 27
See application file for complete search history.

(56) References Cited

U.S. PATENT DOCUMENTS

| 1,880,138 A | 9/1932 | Franz |
| 3,280,991 A | 10/1966 | Melton et al. |

(Continued)

FOREIGN PATENT DOCUMENTS

| EP | 0616275 | 9/1998 |
| EP | 1258324 | 11/2002 |

(Continued)

OTHER PUBLICATIONS

Bauman; Utah Firm Markets on Big Gorilla of an Arm; Deseret News; Jan. 27, 1993; 2 pages.

(Continued)

*Primary Examiner* — Khoi Tran
*Assistant Examiner* — Jorge Peche
(74) *Attorney, Agent, or Firm* — Thorpe North & Western LLP

(57) ABSTRACT

A method for controlling a tele-operated robot agile lift system is disclosed. The method comprises manipulating a human-machine interface of a master robot located on a mobile platform. The human machine interface is kinematically equivalent to a user's arm with a plurality of support members. A position value and a torque value is measured for each support member. The position value and torque value are communicated to support members of a kinematically equivalent slave arm to position the support members to correspond with a position of the human-machine interface.

21 Claims, 11 Drawing Sheets

Related U.S. Application Data application No. 61/481,099, filed on Apr. 29, 2011, provisional application No. 61/481,095, filed on Apr. 29, 2011, provisional application No. 61/481,091, filed on Apr. 29, 2011.

(51) Int. Cl.
| | | |
|---|---|---|
| *B66C 13/44* | (2006.01) | |
| *B25J 5/00* | (2006.01) | |
| *B25J 3/04* | (2006.01) | |
| *B25J 9/00* | (2006.01) | |
| *B66C 1/42* | (2006.01) | |
| *B25J 13/02* | (2006.01) | |

(56) References Cited

U.S. PATENT DOCUMENTS

| | | | |
|---|---|---|---|
| 4,046,262 A * | 9/1977 | Vykukal et al. | 414/5 |
| 4,179,233 A | 12/1979 | Bromell et al. | |
| 4,251,791 A | 2/1981 | Yanagisawa et al. | |
| 4,483,407 A | 11/1984 | Iwamoto et al. | |
| 4,567,417 A * | 1/1986 | Francois et al. | 318/632 |
| 4,591,944 A * | 5/1986 | Gravel | 361/170 |
| 4,661,032 A | 4/1987 | Arai | |
| 4,666,357 A | 5/1987 | Babbi | |
| 4,762,455 A * | 8/1988 | Coughlan et al. | 414/4 |
| 4,768,143 A | 8/1988 | Lane et al. | |
| 4,853,874 A * | 8/1989 | Iwamoto et al. | 700/249 |
| 4,883,400 A | 11/1989 | Kuban et al. | |
| 4,921,292 A | 5/1990 | Harwell et al. | |
| 4,997,095 A | 3/1991 | Jones et al. | |
| 5,038,089 A * | 8/1991 | Szakaly | 701/23 |
| 5,072,361 A | 12/1991 | Davis et al. | |
| 5,101,472 A | 3/1992 | Repperger | |
| 5,105,367 A | 4/1992 | Tsuchihashi et al. | |
| 5,239,246 A * | 8/1993 | Kim | 318/568.11 |
| 5,282,460 A | 2/1994 | Boldt | |
| 5,336,982 A | 8/1994 | Backes | |
| 5,399,951 A * | 3/1995 | Lavallee et al. | 318/567 |
| 5,845,540 A * | 12/1998 | Rosheim | 74/490.05 |
| 5,949,686 A | 9/1999 | Yoshinada et al. | |
| 5,967,580 A * | 10/1999 | Rosheim | 294/198 |
| 5,994,864 A | 11/1999 | Inoue et al. | |
| 6,016,385 A * | 1/2000 | Yee et al. | 700/245 |
| 6,170,162 B1 | 1/2001 | Jacobsen et al. | |
| 6,272,924 B1 | 8/2001 | Jansen | |
| 6,301,526 B1 | 10/2001 | Kim et al. | |
| 6,394,731 B1 | 5/2002 | Konosu et al. | |
| 6,430,473 B1 | 8/2002 | Lee et al. | |
| 6,507,163 B1 * | 1/2003 | Allen | 318/560 |
| 6,659,703 B1 | 12/2003 | Kirkley | |
| 6,663,154 B2 | 12/2003 | Pancheri | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 | 8/2008 | Schiele et al. | |
| 7,783,384 B2 | 8/2010 | Kraft | |
| 7,862,524 B2 | 1/2011 | Carignan et al. | |
| 8,024,071 B2 | 9/2011 | Komatsu et al. | |
| 8,151,401 B2 | 4/2012 | Cheyne | |
| 8,452,447 B2 * | 5/2013 | Nixon | 700/245 |
| 8,473,101 B2 | 6/2013 | Summer | |
| 8,529,582 B2 * | 9/2013 | Devengenzo et al. | 606/130 |
| 8,560,118 B2 * | 10/2013 | Greer et al. | 700/247 |
| 2003/0152452 A1 | 8/2003 | Hodgson | |
| 2005/0193451 A1 | 9/2005 | Quistgaard et al. | |
| 2006/0149419 A1 | 7/2006 | Ogawa et al. | |
| 2006/0184275 A1 * | 8/2006 | Hosokawa et al. | 700/245 |
| 2006/0245897 A1 | 11/2006 | Hariki et al. | |
| 2007/0105070 A1 | 5/2007 | Trawick | |
| 2007/0123997 A1 | 5/2007 | Herr et al. | |
| 2008/0281468 A1 | 11/2008 | Jacobsen et al. | |
| 2009/0038258 A1 | 2/2009 | Pivac et al. | |
| 2009/0039579 A1 | 2/2009 | Clifford et al. | |
| 2009/0210093 A1 | 8/2009 | Jacobsen | |
| 2010/0089855 A1 | 4/2010 | Kjolseth | |
| 2010/0198402 A1 * | 8/2010 | Greer et al. | 700/247 |
| 2011/0046781 A1 | 2/2011 | Summer | |
| 2011/0071677 A1 | 3/2011 | Stilman | |
| 2012/0237319 A1 | 9/2012 | Jacobsen et al. | |

FOREIGN PATENT DOCUMENTS

| | | | |
|---|---|---|---|
| JP | 52013252 | | 2/1977 |
| JP | H01-295772 | | 11/1989 |
| JP | H02-51083 | | 4/1990 |
| JP | H03-85398 | | 8/1991 |
| JP | HO4 44296 | | 4/1992 |
| JP | 5004177 | | 1/1993 |
| JP | H07-1366 | | 1/1995 |
| JP | 7060679 | | 3/1995 |
| JP | H07-112377 | | 5/1995 |
| JP | H07-031291 | * | 6/1995 |
| JP | HO7-31291 | | 6/1995 |
| JP | H07-246578 | | 9/1995 |
| JP | 9011176 | | 1/1997 |
| JP | 11130279 | | 5/1999 |
| JP | 2005/334999 | | 12/2005 |
| WO | WO 2007/144629 | | 12/2007 |
| WO | WO 2009/143377 | | 11/2009 |

OTHER PUBLICATIONS

Jacobsen; Science, Robotics, and Superheroes; Presented at University of Utah's Science at Breakfast, Mar. 17, 2010; 16 pages.

Heavy-Duty Magnetic Base, 300 lb (1334 N) Holding Force, ¼-20Thread; Newport; http://search.newport.com/?q=*&x2=sku&q2=200; as accessed Apr. 23, 2011; 1 page.

Jacobsen et al; Research Robots for Applications in Artificial Intelligence, Teleoperation and Entertainment; The International Journal of Robotics Research; Apr.-May 2004; pp. 319-330; vol. 23, No. 4-5.

Kim et al; A Force Reflected Exoskeleton-Type Masterarm for Human-Robot Interaction; IEEE Transactions on Systems, Man and Cybertentics-Part A: Systems and Humans; Mar. 2005; pp. 198-212; vol. 35, No. 2.

Manipulator Dynamics; Amikabir University of Technology; Computer Engineering and Information Technology Department; Power Point; 44 pages.

Schuler et al; Dextrous Robot Arm; In Proceedings of the 8$^{th}$ ESA Workshop on Advanced Space Technologies for Robotic and Automation; 'ASTRA 2004' ESTEC, Noordwijk, The Netherlands, Nov. 2-4, 2004; 8 pages.

Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.

Tmsuk, Rescue Robot "T-53" release Control Technologies to Control the Synchronous Operation of the Arm; http://robot.watch.impress.co.jp/cda/news/2007/07/18/564.html; as accessed Sep. 1, 2011; 5 pages.

U.S. Appl. No. 13/332,129, filed Dec. 20, 2011; Stephen C. Jacobsen.
U.S. Appl. No. 13/332,138, filed Dec. 20, 2011; Stephen C. Jacobsen.
U.S. Appl. No. 13/332,146, filed Dec. 20, 2011; Stephen C. Jacobsen.
U.S. Appl. No. 13/332,160, filed Dec. 20, 2011; Stephen C. Jacobsen.
U.S. Appl. No. 13/421,612, filed Mar. 15, 2012; Stephen C. Jacobsen.
U.S. Appl. No. 13/332,165, filed Dec. 20, 2011; Stephen C. Jacobsen.

Yeates; Utah-Built Robot Safeguards the Workplace; http://www.ksl.com?nid=148&sid=17654421&autostart=y; Oct. 13, 2011; 3 pages.

Giant Robot Grabbing Hands Grab All They Can; Jul. 17, 2007; 3 pages; www.digitalworldtokyo.com/index.php/digital_tokyo/articles/giant_robot_grabbing_hands_grab_all_they_can/.

Industrial Magnetics, Inc.—PowerLift® Magnets; www.magnetics.com/product.asp?ProductID=1; 2 pages; as accessed Nov. 6, 2012.

Magnetic Base; www.ask.com/wiki/magnetic_base; 2 pages; page last updated Sep. 12, 2012.

PCT/US2012/035553; filed Apr. 27, 2012; Raytheon; International Search Report dated Oct. 31, 2012.

PCT/US2012/035570; filed Apr. 27, 2012; Raytheon Company; International Search Report dated Feb. 8, 2013.

PCT/US2012/038811; filed Apr. 27, 2012; Raytheon Company;

(56) References Cited

OTHER PUBLICATIONS

International Search Report dated Feb. 13, 2013.
Barras; "Stabilization of a Biped Robot with its arms—A Practical Approach"; May 1, 2010; http://biorob.epfl.ch/files/content/sites/biorob/filed/users/170220/public/Report.pdf; retrieved on Jul. 10, 2013.
Moosavian, et al.; "Dynamics Modeling and Tip-Over Stability of Suspended Wheeled Mobile Robots with Multiple Arms"; Oct. 29, 2007; IEEE; pp. 1210-1215.
PCT/US2012/035609; filed Apr. 27, 2012; Raytheon Company; search report dated Jul. 29, 2013.
PCT/US2012/035620; filed Apr. 27, 2012; Raytheon Company; search report dated Jul. 7, 2013.
PCT/US2012/035592; filed Apr. 27, 2012; Raytheon Company; search report dated Aug. 2, 2013.
U.S. Appl. No. 13/332,129, filed Dec. 20, 2011; Stephen C. Jacobsen; office action issued Dec. 23, 2013.
PCT/US2012/035511; filed Apr. 27, 2012; Raytheon Company; International Search report dated Mar. 4, 2013.
U.S. Appl. No. 13/332,138, filed Dec. 20, 2011; Stephen C. Jacobsen; office action dated Mar. 10, 2014.
U.S. Appl. No. 13/332,160, filed Dec. 20, 2011; Stephen C. Jacobsen; office action dated Mar. 12, 2014.
U.S. Appl. No. 13/332,129, filed Dec. 20, 2011; Stephen C. Jacobsen; office action dated Jun. 17, 2014.
U.S. Appl. No. 13/332,160, filed Dec. 20, 2011; Stephen C. Jacobsen; notice of allowance mailed Jul. 8, 2014.
U.S. Appl. No. 13/332,146, filed Dec. 20, 2011; Stephen C. Jacobsen; office action dated Jul. 24, 2014.
Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.
U.S. Appl. No. 13/421,612, filed Mar. 15, 2012; Stephen C. Jacobsen; office action dated Oct. 7, 2014.
U.S. Appl. No. 13/332,138, filed Dec. 20, 2011; Stephen C. Jacobsen; Notice of Allowance mailed Oct. 10, 2014.
U.S. Appl. No. 13/332,129, filed Dec. 20, 2011; Stephen C. Jacobsen; Notice of Allowance mailed Oct. 24, 2014.
U.S. Appl. No. 13/332,146, filed Dec. 20, 2011; Stephen C. Jacobsen; office action dated Nov. 17, 2014.

* cited by examiner

SYSTEM AND METHOD FOR CONTROLLING A TELEOPERATED ROBOTIC AGILE LIFT SYSTEM

PRIORITY DATA

This application claims the benefit of U.S. Provisional Application Ser. No. 61/481,103, filed Apr. 29, 2011, which is incorporated by reference herein in its entirety. This application also claims the benefit of U.S. Provisional Application Ser. Nos. 61/481,110, filed Apr. 29, 2011; 61/481,089, filed Apr. 29, 2011; 61/481,099, filed Apr. 29, 2011; 61/481,095, filed Apr. 29, 2011; and 61/481,091, filed Apr. 29, 2011, each of which are incorporated by reference herein in their entirety.

BACKGROUND

The idea of using robotics to assist in every day functions has long been promised. This concept, however, has been slow to deliver. Limitations in computer processing, materials science, battery power, motor design and sensor design, to name a few, have resulted in a very slow evolution in the design and functionality of robotic systems. While many types of highly specialized robotic systems exist, more general purpose robotics systems remain scarce.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
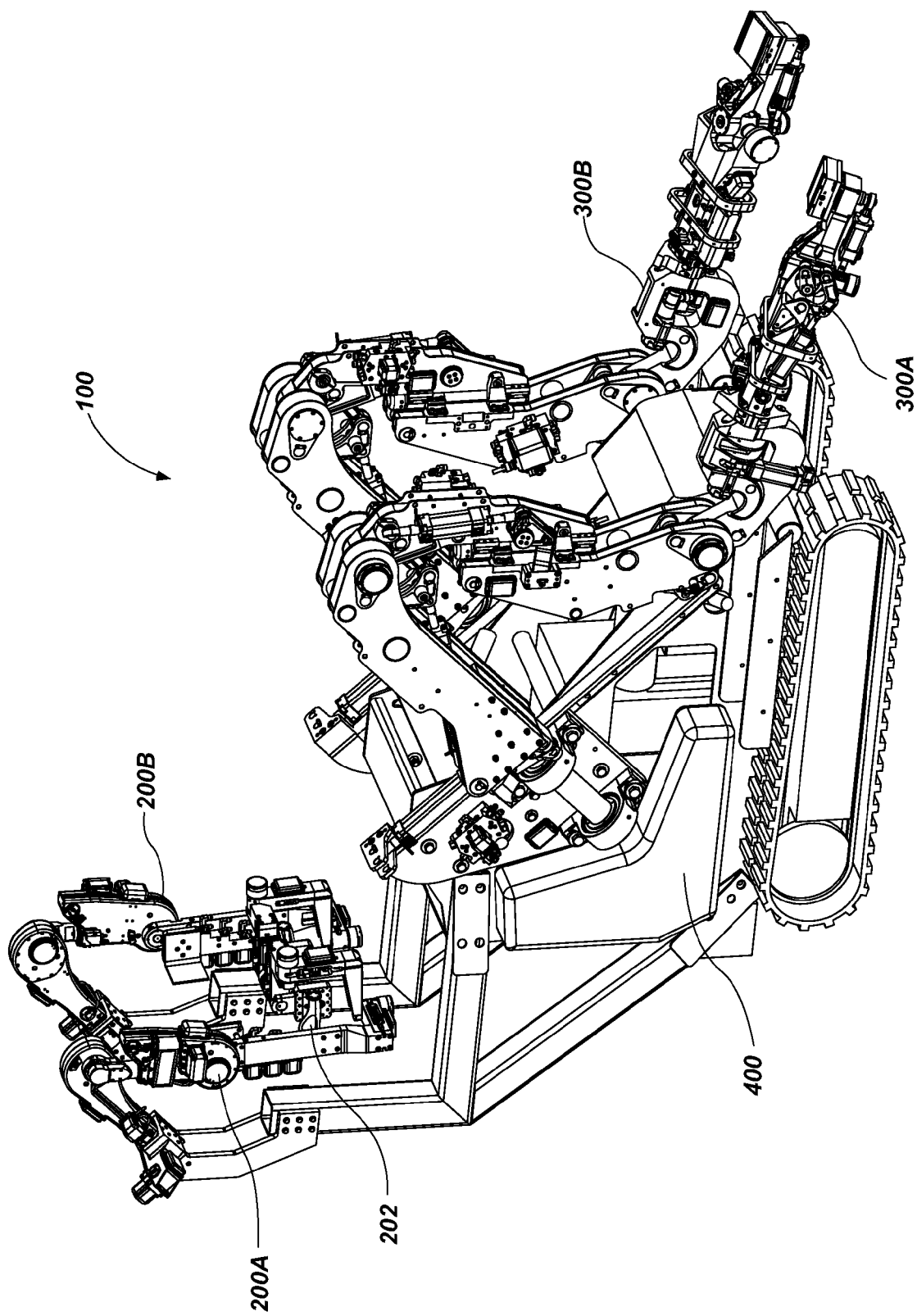
FIG. 1 is an example illustration of a robotic agile lift system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

The present invention is related to copending nonprovisional U.S. patent application Ser. Nos. 13/332,165, filed Dec. 20, 2011, and entitled, "Teleoperated Robotic System"; 13/332,138, filed Dec. 20, 2011, and entitled, "Platform Perturbation Compensation"; 13/332,146, filed Dec. 20, 2011, and entitled, "Robotic Agile Lift System with Extremity Control"; 13/332,129, filed Dec. 20, 2011, and entitled, "Multi-degree of Freedom Torso Support for a Robotic Agile Lift System"; 13/332,160, filed Dec. 20, 2011, and entitled, "Variable Strength Magnetic End Effector for Lift Systems", each of which is incorporated by reference in its entirety herein.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "kinematically equivalent" or "kinematic equivalence" refer to a relationship between two or more separate systems of rigid bodies. Each system includes a similar number of rotational joints. Each rotational joint can provide a rotational degrees of freedom (DOF). Kinematically equivalent systems have a similar corresponding number of rotational DOF, with a proportional length between the systems. It is noted that "equivalent" or "equivalence" does not refer to a kinematic identity between the systems. Indeed, "kinematically equivalent" or "kinematic equivalence" can include some degree of variation from true kinematic identity.

As used herein, the term tele-operated is defined as a system wherein a master robotic system communicates with a slave robotic system to control the slave robotic system.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The ability of robotics systems to perform a variety of different types of functions can be greatly enhanced through the creation of a human-machine interface. The interface can enable a human to enhance the capabilities of the robotic system by providing intuitive input in the performance of tasks. Similarly, the robotic system can enhance the capabilities of the human by performing such actions as repetitive tasks, assisting in the lifting and moving of heavy objects, and increasing the accuracy and stability of delicate tasks. While a human-machine interface can provide a symbiotic relationship between a human and a robotic system, the design of the interface can contribute greatly to the difference between a high fidelity, intuitive robotic system and one that is cumbersome and arduous to operate. A system that is non-intuitive or requires excessive degrees of control can quickly tire a person out or even make a person sick. Thus, the symbiosis provided by the human-robot relationship can be enhanced through a well designed human-machine interface.

Accordingly, a system and method for controlling a tele-operated robot is disclosed. The tele-operated system can include a master robotic system that communicates with a slave robotic system. The master robotic system can be kinematically equivalent with both the user and the slave robotic system. This can allow the user to operate the master robotic system to control the slave robotic system to perform high fidelity dexterous manipulations with the slave robotic system in a work environment.

The master and slave robotic systems may be operated in close proximity. For instance, the master and slave robotic systems may be co-located on a single platform. The co-located robotic systems may communicate via wired or wireless means. The wired communication means can include a wired connection and/or a fiber optic connection to transfer data between the master and slave robotic systems. The wireless communication means can be based on a selected wireless communication standard such as a Bluetooth® standard, an Institute of Electrical and Electronics Engineer (IEEE) 802.11x standard, an 802.15x standard, an 802.16x standard, a $3^{rd}$ Generation Partnership Project (3GPP) Long Term Evolution (LTE) standard, and the like. Any type of wired or wireless communication means that can transmit data between the master robotic system and the slave robotic system at a sufficient speed to allow the systems to properly function is considered to be within the scope of the present invention.

Alternatively, the master robotic system may be remotely located from the slave robotic system. In this embodiment, the operator can use a video system to view the slave robotic system that is controlled using the remotely located master robotic system. The master robotic system may be remotely located from the slave robotic system at a distance of tens of feet to thousands of feet from the master robotic system. Alternatively, the distance may be tens to thousands of miles. The remotely located master and slave robotic systems can communicate via wired or wireless means, as previously discussed.

The master robotic system can have a master control arm that acts as the human-machine interface. The master control arm can be configured to be kinematically equivalent to the user's arm. A typical human arm includes seven degrees of freedom from the shoulder to the wrist. Specifically, a human shoulder includes three DOF: abduction/adduction, flex/extend, and humeral rotation. A human elbow includes one DOF. A human wrist can be generalized to include three DOF: wrist rotation, abduction/adduction, and flex/extend. The upper arm extends from the shoulder and is connected to the lower arm by the elbow. The wrist is at the opposite end of the lower arm from the elbow. The human arm from the shoulder to the wrist can thus be generalized as a kinematic system that includes a first (shoulder) joint having three rotational DOF connected to a second (elbow) joint having one DOF by a first linkage, which is connected to a third (wrist) joint having three DOF by a second linkage.

The master control arm can be configured to be kinematically equivalent to the human arm. The amount of kinematic equivalence may vary depending on the design and operational needs of the slave robotic system. For instance, a less expensive model of the master control arm used to control a simple slave arm on the slave robotic system may only require five DOF to perform the jobs that it is designed to do, with no need for two of the three wrist DOF. Alternatively, a more complex master control arm can include all seven of the DOF in the human arm. Additional DOF can be included in a device used to control an end effector, such as a gripping device, that is attached to the slave arm on the slave robotic system.

The length of each segment of the master control arm can be equivalent to the position and length of a human arm. In one embodiment, the length of each segment of the master robotic system can be substantially equivalent to the length of the user's arm. Alternatively, some variation in the length may be useful to accommodate design challenges in the master control arm, as well as differences in the lengths of the arms of different human operators. For example, the joint(s) in the master control arm that are kinematically equivalent to the human shoulder may be located at a greater distance from the kinematically equivalent elbow joint than is typical in a human arm. It has been found that some variation in the location of the shoulder joint(s) of the human-machine interface (master control arm) relative to the user's shoulder joint does not substantially burden the user in controlling the slave robotic system. However, the length and position of the lower joints, such as the kinematic equivalence of the wrist joint(s) and elbow joint, can be made to comprise a greater degree of equivalency to provide a more intuitive design that is more user friendly, and that allows the slave arm to more closely approximate the behavior and his/her movements as made with the master control arm.

The slave arm on the slave robotic system can be kinematically equivalent to the human arm and/or the control arm on the master robotic system. The slave arm typically includes the same number of DOF as the master control arm. The length of each segment in the slave robotic system can be proportional to the length of the user's arm. The arm segments may be a selected multiplication factor longer than the user's arm segments and/or the segments of the master robotic system. For instance, the length of the segments in the slave robotic system relative to the master robotic system can be a ratio of 1:1, 1.5:1, 2:1, 3:1, 5:1, or some other desired ratio. The length of the segments in the slave robotic system can depend on the intended function(s) that the robotic system is designed to perform, as well as on design considerations such as cost, weight, speed, and motor control, to name a few. Each segment of the slave arm may not have the same proportions. For instance, the segment of the slave arm representing the upper arm may by longer than the human arm by a ratio of three to one, while the segment of the slave arm representing the lower arm may be longer than the human arm by a ratio of 2.5 to one.

A user can control the slave arm on the slave robotic system by interfacing with the master control arm on the master robotic system through the user's arm. In one embodiment, the master robotic system can include two machine interfaces (control arms), one for both of the user's arms. The slave robotic system can then include two kinematically equivalent slave arms that can be controlled by the user through the master control arms. Alternatively, the master robotic system may include only a single master control arm to control a single robotic arm on the slave robotic system.

The kinematic equivalence of the user's arm, the master control arm of the master robotic system, and the slave arm of the slave robotic system enables the user to quickly and intuitively control the actions of the robotic arm. A relatively small amount of training is necessary to enable the user to become fluent in controlling the slave arm since the kinematic equivalence of the master control arm with the slave arm enables the user to naturally move the slave arm as the user moves the master control arm on the master robotic system with his or her arm. The slave arm is configured as a high fidelity dexterous manipulator, thereby enabling the user to work with the slave arm to accomplish tasks more quickly and more easily than would be possible alone.

A number of different types of end effectors can be added to the end of the slave arm. The type and design of the end effector depends on the desired function of the slave arm. The end effector may be as simple as a gripping jaw that can be used to pick items up. Alternatively, a more complex system such as an end effector with six degrees of freedom can enable the slave arm to be used to perform complex tasks including the use of tools grasped by the end effector. The master control arm can include a control that is kinematically equivalent to the end effector to allow the user to control each of the degrees of freedom of the end effector. The control will typically be located at the end of the wrist control on the master control arm.

A user can interact with the kinematically equivalent master control arm to control the kinematically equivalent slave arm to accomplish a number of tasks, such as lifting heavy objects, performing repetitive tasks, moving heavy objects from one location to another, performing one or more tasks while lifting a heavy object, and activating and operating tools using one or more slave arms. The tele-operated robotic system can be used to increase a person's productivity, while reducing strain and injuries on the person.

One example embodiment of a tele-operated robotic system 100 is illustrated in FIG. 1. The system can include master control arms 200A and 200B, slave arms 300A and 300B, and platform 400. In use, a user can manipulate the master control arms to control movement of the slave arms. The platform can be mobile, as shown in the figure, or fixed at a permanent location. In one aspect, the platform can provide support for the slave arms 300A, 300B. In another aspect, the platform can provide support for the master control arms 200A, 200B and for a tele-operator, or user, of the robotic system. Thus, a mobile platform can allow the robotic system 100 to be moved from place to place to locate the slave arms in a position for use.

The master control arms 200A and 200B are configured to be manipulated by the user to control movement of the slave arms 300A and 300B, respectively. For example, the user can grasp handle 202 located at a distal end of the master control arm 200A to manipulate the master control arm. In general, the master control arm can include joints and linkages that correspond to the user's arm, such that movement of the user's arm causes the master control arm to move in a manner similar to the user's movement, as previously discussed. The slave arms 300A, 300B can include joints and linkages that correspond to the master control arm and, thus, the user's arm as well to allow them to be kinematically equivalent.

Figure 2A:
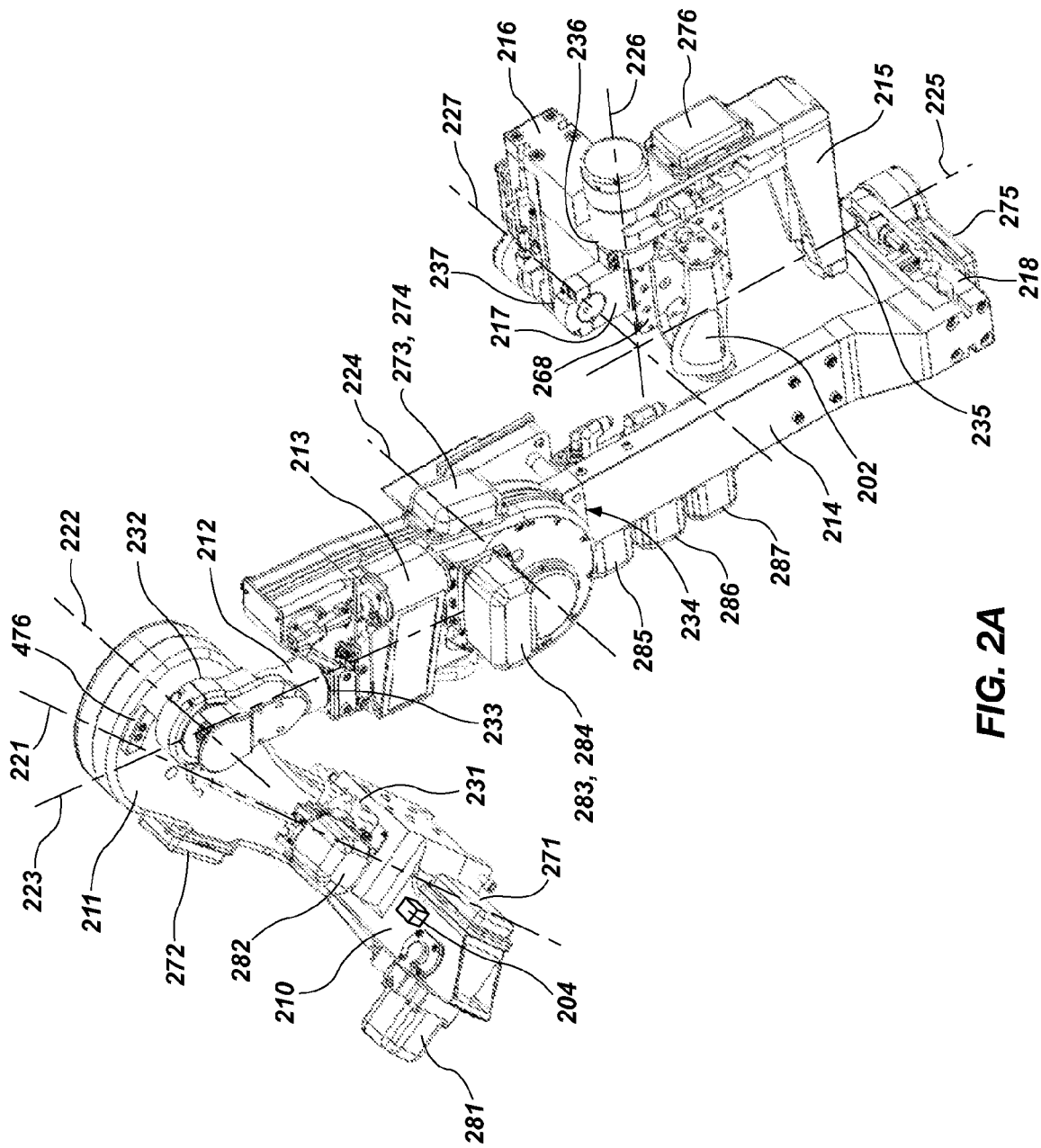
FIG. 2A is an example illustration of a master control arm of the robotic agile lift system in accordance with an embodiment of the present invention.

One example of a master control arm 200A is illustrated in FIG. 2A. For simplicity, the master control arm 200A is shown independent of other components of the robotic system, such as master control arm 200B, slave arms 300A, 300B, and platform 400. In one aspect, the master control arm 200A can be mounted, installed, or otherwise associated with any platform of the present disclosure such that the platform supports the master control arm. In another aspect, the master control arm can be separate from the platform such that a slave arm associated with the platform can be controlled by the master control arm from a distance.

The master control arm 200A illustrated in the example of FIG. 2A is configured as a kinematic system that includes DOF and linkages that correspond to the DOF and linkages of the human arm from the shoulder to the wrist. For example, a first support member 211 is coupled to base 210 at joint 231, which enables rotation about axis 221. Axis 221 provides a rotational DOF corresponding to abduction/adduction of the human shoulder. As shown in FIG. 2A, axis 221 is at about a 45 degree angle relative to a horizontal plane. Axis 221 can be positioned from about 0 degrees to about 90 degrees relative to a horizontal plane. A 45 degree angle for axis 221 can allow the base 210 to be positioned behind the user, which can be advantageous for locating support apparatus for the master control arm 200A to allow unrestricted movement of the user during use of the master control arm. Axis 221 can be offset (e.g., up to several feet) from the user's shoulder and still form part of a system that is kinematically equivalent to the user's arm. In one aspect, axis 221 forms the least sensitive DOF in establishing kinematic equivalence with the user's arm. In other words, more variation can be tolerated here than between other corresponding DOF between the master control arm and the user's arm.

First support member 211 can extend from the base 210 to position joint 232 in the vicinity of the user's shoulder. Joint 232 is coupled to or connects a second support member 212 and forms axis 222, which provides a rotational DOF corresponding to flex/extend DOF of the human shoulder. In some aspects, joint 232 can be positioned to a side of the user's shoulder. In other aspects, joint 232 can be above or below the user's shoulder. In still other aspects, joint 232 can be in front or behind the user's shoulder. Joint 232 can be offset (e.g., up to several feet) from the user's shoulder and still form part of a system that is kinematically equivalent to the user's arm. In one aspect, axis 222 is the second least sensitive DOF in establishing kinematic equivalence between the master control arm 200A and the user's arm.

The second support member 212 extends from the joint 232 and is coupled to or connects a third support member 213 by joint 233, which forms axis 223. Axis 223 provides a rotational DOF corresponding to humeral rotation of the human shoulder. Joint 233 can be offset (e.g., up to several feet) from the user's shoulder and still form part of a system that is kinematically equivalent to the user's arm. In one aspect, axis 223 is the third least sensitive DOF in establishing kinematic equivalence with the user's arm.

Thus, in a kinematically equivalent system, three separate joints of the master control arm 200A can correspond to the single joint of the human shoulder. In general, the DOF of the master control arm corresponding to the human shoulder are the least sensitive DOF in establishing kinematic equivalence between the master control arm and the user's arm. In other words, the location and orientation of the DOF of the master control arm corresponding to the human shoulder can tolerate the most variation or offset distance in length and distance from the corresponding user's arm and still be considered to provide kinematic equivalence with the user's arm. In such cases, the various support members will comprise various lengths to provide such offset distances of the respective joints.

The second support member 212 and the third support member 213 combine to form a linkage between axis 222 and axis 224 that corresponds to the human upper arm. The third support member 213 is coupled to a fourth support member 214 by joint 234, which forms axis 224. Axis 224 provides a rotational DOF corresponding to a human elbow. In general, the linkage formed by the second support member 212 and the third support member 213 can position the joint 234 in the vicinity of the user's elbow, such as to a side of the user's elbow. Joint 234 can be up to several feet from the user's elbow and still form part of a system that is kinematically equivalent to the user's arm. In one aspect, the position of axis 224 relative to the user's arm is less tolerant of variation than the position of the DOF corresponding to the user's shoulder and thus is a more sensitive DOF in establishing kinematic equivalence with the user's arm.

The fourth support member 214 is coupled to a fifth support member 215 at joint 235, which forms axis 225. Axis 225 provides a rotational DOF corresponding to human wrist rotation. The fifth support member 215 is coupled to a sixth support member 216 at joint 236, which forms axis 226. Axis 226 provides a rotational DOF corresponding to human wrist abduction/adduction. The sixth support member 216 is coupled to a seventh support member 217 at joint 237, which forms axis 227. Axis 227 provides a rotational DOF corresponding to human wrist flex/extend. Thus, three separate joints of the master control arm can correspond to the human wrist. It will be recognized that the DOF of the master control arm corresponding to the DOF of the operator's wrist may be the most sensitive and least tolerant of variation in position establishing kinematic equivalence with the user's arm from the shoulder to the wrist. However, there is some degree of permissible variation between kinematically equivalent systems based on the system design and use.

In one aspect, the DOF about axis 227 is the most sensitive to variation for kinematic equivalency, the DOF about axis 226 is the second most sensitive, and the DOF about axis 225 is the third most sensitive. Accordingly, axes 225, 226, 227 closely correspond with the location of the user's wrist DOF. In one aspect, the axes 225, 226, 227 are within about six inches of the user's wrist. In a more particular aspect, the axes 225, 226, 227 may be located within about two inches of the user's wrist. In an even more particular aspect, the axes 225, 226, 227 may be located within about one inch of the user's wrist.

In the example shown in FIG. 2A, the master control arm can include structure that positions the wrist DOF of the user in sufficient alignment with the corresponding DOF of the master control arm about axes 225, 226, and 227, such that kinematic equivalency can result. The wrist positioning structure is configured to support the handle 202 such that when the user is grasping the handle to manipulate the master control arm, the user's wrist is appropriately positioned relative to the DOF of the master control arm corresponding to the DOF of the user's wrist.

The wrist positioning structure can include an extension member 218. The extension member 218 can be integral with or attached to the fourth support member 214. In one aspect, the extension member 218 can be configured to extend beyond the handle 202 to position the joint 235 in front of the user's hand. The extension member 218 can also provide an offset for the axis 225 relative to the fourth support member 214. The extension member 218 can be configured to position the axis 225 to sufficiently align with the corresponding DOF of the user's wrist. The fifth support member 215 can offset the joint 236 to be on a side of the user's wrist and can be configured to position the joint 236 behind the handle 202, such that the user's wrist will be sufficiently aligned with the axis 226. The sixth support member 216 can offset the joint 237 to be on another side of the wrist. The handle 202 is offset forward of the joint 237, such that when the user grasps the handle, the user's wrist will be sufficiently aligned with the axis 227. The seventh support member 217 can be configured to position the handle 202 beyond, or in front of, the axes 226, 227. In one aspect, the axes 225, 226, 227 can be orthogonal to one another and can be configured to sufficiently align with the DOF of the user's wrist.

In certain aspects, the extension member 218 can provide an offset for the axis 225 relative to the fourth support member 214, the second support member 212, and/or the third support member 213. This offset can provide a space for the user's arm and can position the fourth support member 214, the second support member 212, and/or the third support member 213 to a side of the user's arm. For example, the extension member 218 can position the axis 225 such that it is sufficiently aligned with the corresponding wrist DOF of the user when the user is grasping the handle 202 and provide enough room for the user's arm next to the master control arm.

In other aspects, the fourth support member 214, the extension member 218, the fifth support member 215, the sixth support member 216, and the seventh support member 217 can be configured to provide sufficient space around the handle to accommodate buttons, switches, levers, or other control structures to allow the user to control the robotic system 100.

Figure 2B:
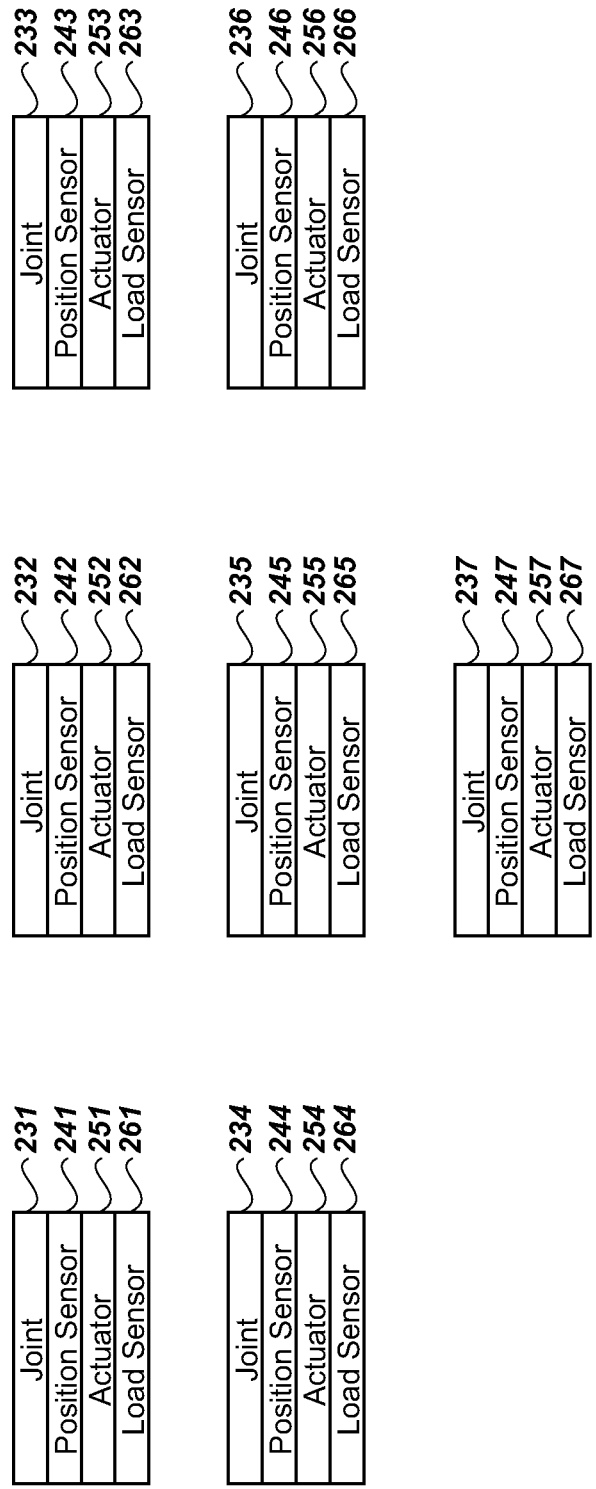
FIG. 2B is an example list of sensors employed in the master control arm in accordance with an embodiment of the present invention.

Each joint 231-237 in the master control arm 200A can be associated with a position sensor 241-247, an actuator 251-257, and a load sensor 261-267, respectively, as illustrated in FIG. 2B. The way in which the load sensor, position sensor, and actuator are coupled to the joint is dependent on the design of the master control arm, the type of locomotive force (i.e. electrical, hydraulic, or pneumatic), and the types of sensors used. One example embodiment of the system using a hydraulic pump is described in copending U.S. application, Ser. No. 13/332,165, filed Dec. 20, 2011, which is herein incorporated by reference in its entirety.

With further reference to FIG. 2A, the position sensors are associated with the DOF of the master control arm. In one aspect, there is one position sensor for each DOF. The position sensors can be located, for example, at each of the joints 231, 232, 233, 234, 235, 236, and 237. Because the DOF of the master control arm at these joints are rotational, the position sensors can be configured to measure angular position.

In one aspect, the position sensors can detect a change in position of the master control arm at each DOF. As discussed further below, this change in position of the master control arm can be used to cause a proportional change in position of the corresponding DOF of the slave arm. In one embodiment, the position sensor can be an absolute position sensor that enables the absolute position of each joint to be determined at any time. Alternatively, the position sensor may be a relative position sensor. One example of a position sensor that can be used is an encoder disk produced by Gurley Precision Instrument, Manufacturer P/N AX09178. The encoder disk can be coupled to each joint 231-237 in the master control arm. An encoder reader produced by Gurley Precision Instrument, P/N 7700A01024R12U0130N can be used to read the encoder disk to provide an absolute position reading at each joint.

The position sensors can include any type of suitable position sensor for measuring a rotation of each joint, including but not limited to an encoder, a rotary potentiometer, and other types of rotary position sensors.

The master control arm 200A can include actuators 251, 252, 253, 254, 255, 256, 257 (FIG. 2B). The actuators are associated with the DOF of the master control arm. The actuators can be used to enable force reflection from the slave to the master control arm. The actuators can also be used to enable gravity compensation of the master control arm, as discussed hereinafter.

In one aspect, there is one actuator for each DOF of the master control arm. The actuators can be linear actuators, rotary actuators, etc. The example embodiment illustrated in FIG. 2A, for example, can include rotary actuators. The actuators can be operated by electricity, hydraulics, pneumatics, etc. For example, the actuators may be operated through the use of a hydraulic pump manufactured by Parker, P/N PVP1630B2RMP.

Each actuator 251-257 (FIG. 2B) may be controlled using an electric motor. Alternatively, hydraulic or pneumatic servo valves can be opened or closed to enable a selected amount of hydraulic or pneumatic fluid to apply a desired level of force to the actuator to apply a torque to the corresponding joint. In one embodiment, a pair of servo valves can be associated with each actuator, enabling one of the valves to open to apply a desired torque to the actuator in a selected direction. The other valve can be opened to apply force in the opposite direction. The master control arm 200A can include servo valve pairs 281, 282, 283, 284, 285, 286, and 287 that are each hydraulically or pneumatically coupled to an actuator. One type of servo valve that can be used is manufactured by Vickers under part number SM4-10(5)19-200/20-10S39. Another type of servo valve that can be used is manufactured by Moog, model 30-400A. Additional types of servo valves may be used based on design considerations including the type of valve, the pressure at the valve, and so forth.

The master control arm 200A can also include load sensors 261, 262, 263, 264, 265, 266, 267 (FIG. 2B). A separate load sensor can be associated with each DOF of the master control arm. The load sensors can be used to measure a load, such as a force and/or a torque, in the master control arm. The load measurement can be used to enable force reflection from the slave to the master control arm, discussed further below. The load sensors can also be used to enable gravity compensation of the master control arm. In addition, the load sensors can be used to measure a force applied by a user to the master control arm 200A and apply a proportional force by the slave control arm 300A (FIG. 1).

In one aspect, there is one load sensor for each DOF of the master control arm. For each DOF on the master control arm, there must be at least one unique input describing how the DOF should track the user's movements. Several DOF of the master control arm can be accounted for with a multi DOF load sensor. For example, a multi DOF load sensor capable of measuring loads in six DOF could be associated with axes 225, 226, 227, which correspond to the wrist DOF of the user and axes 221, 222, 223, which corresponds to the shoulder DOF of the user. A single DOF load sensor can be associated with axis 224, which corresponds to the elbow DOF of the user. Thus, load cells totaling seven DOF are sufficient to track motion of a master control arm having seven DOF. Data from the multi DOF load sensors can be used to calculate the load at a DOF between the load sensor location and the base 210.

The load sensors can be located, for example, at each support member of the master control arm. In one aspect, the load sensors 261, 262, 263, 264, 265, 266, 267 can be associated with the actuators 251, 252, 253, 254, 255, 256, 257, as illustrated in FIG. 2B.

The load sensors can include any type of suitable load sensor capable of converting a rotational torque into an electrical signal, including, but not limited to, a strain gauge, a thin film sensor, a piezoelectric sensor, a resistive load sensor, and the like. For example, load sensors that may be used include load cells produced by Sensotec, P/N AL311CR or P/N AL31DR-1A-2U-6E-15C, Futek, P/N LCM375-FSSH00675, or P/N LCM325-FSH00672.

Figure 2C:
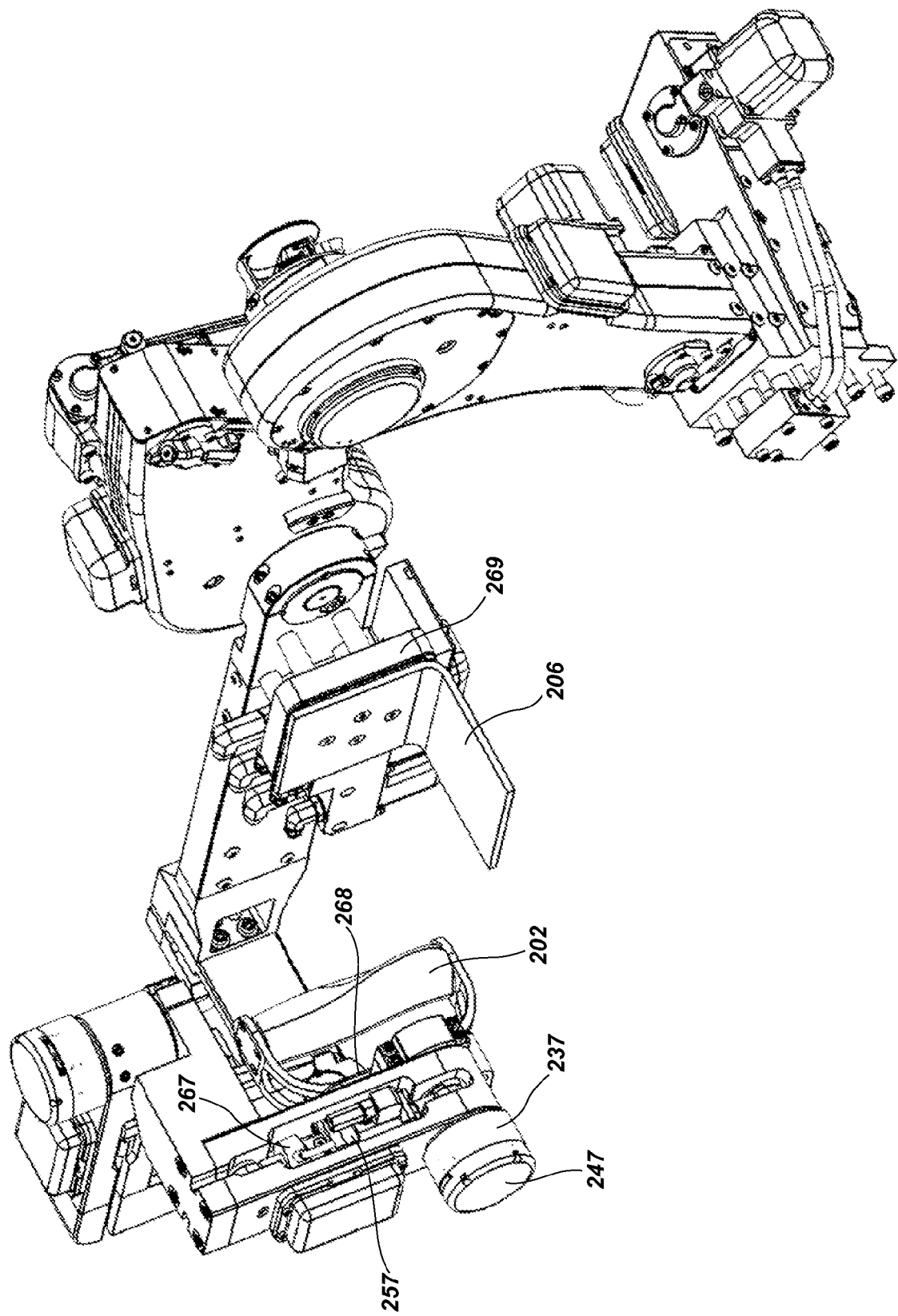
FIG. 2C is another view of the master control arm of FIG. 2A showing load cells coupled to the master control arm in accordance with an embodiment of the present invention.

FIG. 2C provides an illustration of another view of the master control arm 200A. The illustration shows an arm support 206 and a handle 202 that can enable a user to move the master control arm through the various degrees of freedom provided by the joints 231-237. The user can grasp the handle. In one embodiment, the user's arm may be coupled to the arm support using a strap, Velcro, a buckle, or other type of support structure. The movement of the user's arm can be monitored using a load cell 268, 269 that is coupled to the handle 202 and arm support 206. Each load cell can have multiple degrees of freedom. For instance, each load cell may have a degree of freedom along an x, y, and z axis, as well as a rotational moment degree of freedom associate with each axis to measure torque. When the user applies a load to the handle and arm support, the direction and amount of load can be detected by the load cells and communicated to the actuators 251-257 coupled to the joints 231-237. Hydraulic, pneumatic, or electric assistance can be provided at the actuator that in response to the force provided by the user, thereby assisting the user in moving the master control arm.

The use of the load cells 268, 269 to assist the user in moving the control arm allows the user to fluidly move the control arm. The torque assistance provided through the load cells can be used to assist the user in moving the control arm when force feedback is received at the master control arm. The torque assistance can also help the user to overcome inertial forces when accelerating and decelerating the master control arm. The inertial forces may fatigue the user over time. With the torque assistance that is made possible through the use of the load cells, the user can provide small amounts of force in a desired direction to move the master control arm in spite of inertial forces, feedback forces, frictional forces, and other forces that can cause movement of the arm to be resistive. The amount of torque assistance can be limited such that force feedback from the slave arm can still be felt by the user.

FIG. 2C also illustrates an example of a position sensor 247, an actuator 257, and a load sensor 267 that are coupled to joint 237. Depending on the type of position sensor, actuator, or load sensor used at each joint, the actuators and sensors at each joint may be similarly positioned with respect to the joint to which they are coupled.

Returning to FIG. 2A, the master control arm 200A can also include at least one gravity sensor 204. In one embodiment, a separate gravity sensor can be associated with each separate axis of the master control arm. Alternatively, a single gravity sensor can be used. The gravity sensor(s) can be used to measure the gravity vector relative to the platform on which the arm is located or relative to each of the axes of the master control arm, which can be used to enable gravity compensation of the master control arm. For example, a gravity sensor produced by Microstrain, Inc., P/N 3DM-GX1-SK may be used. The gravity sensor(s) can include any type of suitable gravity sensor including, but not limited to, at least one of a tilt sensor, an accelerometer, a gyroscope, and an inertial measurement unit.

The master control arm 200A can also include a general DOF controller (GDC) 271 associated with each DOF. In one embodiment, a separate GDC 271, 272, 273, 274, 275, 276 and 277 can be connected to each of the axes in the master control arm 200A. The GDC can be in communication with the sensors at each joint. For example, GDC 271 can be in communication with position sensor 241 and load sensor 261 associated with the joint. The GDC can also be in communication with the actuator 251 and/or servo valve 281 coupled to the associated joint.

Each GDC 271-277 is used to monitor and adjust the position and torque at a selected joint on the master control arm 200A. Information can also be received at the GDC regarding the position and torque of the associated joint on the slave arm 300A. Each GDC can be in communication with a master controller. The master controller can include a central processing unit, such as an Intel CPU. In one embodiment, the central controller may be located on the base 400 (FIG. 1). Alternatively, each of the master control arms 200A, 200B and slave arms 300A, 300B can include a separate central controller that are in communication. The central controller can act as a relay, passing information between the GDCs on the master and slave arms. The information regarding a torque measurement at each joint in the slave arm can be communicated to the GDC for the associated joint in the master control arm. Additional inputs from other types of sensors may be communicated as well. The GDC at the master control arm can then output a command to the actuator or servo valve to adjust the torque at the associated joint on the master control arm to provide force feedback regarding the interaction of the slave arm with its environment and/or with a load that is lifted by the slave arm. The GDC at each joint can interact with the actuator or servo valve for the associated joint to adjust the torque at the joint and/or move the axis of the DOF by a predetermined amount.

In one embodiment, the GDC 271-277 at each axis on the master control arm can be a computer card containing one or more microprocessors configured to communicate with the sensors and valves and to perform calculations used to control the movements of associated axes on the slave arm. For instance, the GDC can include a general purpose central processing unit (CPU) such as an ARM processor, an Intel processor, or the like. Alternatively, a field programmable gate array (FPGA), application specific integrated circuit (ASIC) or other type of processor may be used. The GDC can communicate with the sensors using wired or wireless means. Various examples of wired and wireless means of communication have been previously discussed and applies to the communication between the GDC, the sensors, and the central controller.

In certain aspects, the tele-operated robotic system 100 can include features to enhance the control that the master control arm has over the slave arm. For example, loads in the master that are due to force reflection from the slave arm can hinder the ability of the user to control the slave arm. Such loads can be overcome by the user but can cause fatigue to the user. In one aspect, the undesirable effects of force reflection in the master control arm can be overcome.

In another aspect, the master control arm can include a torque assistance function or feature to lessen the forces and moments necessary to move the master control arm. With torque assist, the system is tolerant of lower torque gains and inaccurate mass properties. Torque assistance control at the master control arm can help the operator overcome frictional forces in the system such as joint friction, bearing friction, actuator friction, and stiction, as well as viscous damping and dynamic inertial effects of the master control arm and, to some extent, the slave arm as well. The torque assistance can also assist the user in overcoming loads in the master control arm that are due to force reflection from the slave arm that can hinder the ability of the user to control the slave arm. The user can overcome such loads without this feature, but doing so repeatedly can fatigue the user. Thus, although there are many positive aspects of force reflection (e.g., enhanced sensory feedback), a teleoperated robotic system can include a torque assistance feature to minimize the undesirable effects of force reflection in the master control arm (e.g., increased resistance on the user, particularly noticeable when initiating movement of the master control arm) to enhance the user's ability to operate the master control arm to control the slave arm.

In one aspect, a load sensor, such as load sensor 268, can be coupled to the master control arm at a strategic interface location to facilitate interaction or interfacing with the user. As used herein, a "load" can include a force and/or a moment. Thus, a load sensor can sense a force and/or a moment. The load sensor can be configured to sense loads in multiple DOF, and to facilitate output of a load value. The load sensor is capable of detecting linear and/or rotational loads acting on the master control arm. For example, a multi-axis load sensor, such as a six DOF load sensor, can measure three force components along x, y, and z axes of the sensor as well as three moment components acting about the axes. Thus, the load sensor can detect whether the user is in forceful contact with the master control arm. If so, the system can be configured to urge the master control arm in a desired direction to manipulate the master control arm, and to at least reduce the load from the forceful contact. Using load sensor data, such as a force value or moment value, the master control arm can move in response to a load applied to the master control arm by the user, such as in the same direction as the applied load.

For example, when the master control arm is stationary, a forearm of the user may not be in forceful contact with the master control arm. In a particular aspect, an applied load from the user to the master control arm can be detected by a load sensor located on a user interface device coupled to the master control arm proximate to the user's forearm. In another particular aspect, this can be detected by a load sensor associated with one or more DOF of the master control arm, as discussed herein. To move the master control arm proximate to the user's forearm in a desired direction, the user can apply a load to the user interface device and the master control arm, such as by lowering the forearm or pushing the forearm to the side. This load on the user interface device and the master control arm caused by movement of the user causes the master control arm to apply a torque to an actuator, which can be configured to cause the master control arm to move (e.g., in the direction of the applied load by the user). Such response by the master control arm may be sequentially repeated many times until the movement of the user's forearm is completed and the user ceases to apply a load to the master control arm (i.e., there is no longer forceful contact with the master control arm at the location of the load sensor on the user interface device). This feature, as indicated above, may be coupled or implemented with a force reflection function, or can be implemented as a stand-alone system. In any event, the master control arm can sense an applied load from the user and can initiate a torque assistance to assist the user in overcoming torque or forces in the master control arm that would hinder movement in the user's desired direction of movement. In one aspect, the degree of torque assistance can be adjustable, such as with an adjustable gain.

Torque assistance, or a torque assistance function, therefore, can be incorporated into the master control arm to enhance operation of the master control arm by the user. In other words, with force reflection, the slave arm can exert some amount of control on the master control arm. This enhanced mode of operation can limit the negative effects on the user due to resistance in the master control arm and/or the force reflection from the slave arm on the master control arm, therefore maintaining a proper functional relationship between the master control arm and the slave arm. For example, due to force reflection in the master control arm from the slave arm, the master control arm can be configured to be resistant to movement by the user. Utilizing a load sensor on the master control arm that is associated with one or more DOF in the master control arm to detect loads applied by the user and applying torque to the master control arm to cause the master control arm to move can assist the user in overcoming the resistance felt by the user in the master control arm. The torque assistance function, while not being required to do so, is typically configured so as to cause movement of the master control arm in the direction of the applied load by the user.

Within the torque assistance function, a load sensor that senses a load applied by the user and that is supported about the master control arm and that is associated with one or more DOF in the master control arm means that the load sensor can sense load data and provide a load value that can be used at the various one or more DOF to cause the master control arm to move in response to the user applied load. In one exemplary embodiment, the load sensor that receives the applied load from the user may be associated with a user interface device and be located at a position offset from the location of other load sensors at the joints. In another exemplary embodiment, the torque assistance function may be configured to utilize the already existing load cells at the joints rather than requiring a separate load sensor within a user interface device.

With the torque assist function, the master control arm (e.g., at least two support members coupled at a joint) is caused to move based, at least in part, on this load value. The torque assist function can reduce user fatigue and improve ease of operation of the master control arm by the user. In one aspect, the torque assistance can be sufficient to at least assist the user in overcoming the force reflective resistance load in the master control arm. In another aspect, the gain can be set such that the torque assistance can exceed the force reflective resistance load in the master control arm.

In one aspect, a range of motion limiter can be incorporated to physically interfere with the movement of the base or a support member relative to an adjacent coupled support member. For example, limiter 476 is an illustration of a physical limiter or stop and is coupled to the first support member 211. The limiter 476 can be located and configured to contact a portion of the second support member 212 as the second support member rotates relative to the first support member 211. Physical limiters or stops can prevent excess motion that may damage the master control arm or endanger the user. In another aspect, the tele-operated robotic system can implement additional range of motion controls, such as programmed limits and can decelerated the master control arm as it nears a physical limit to prevent an impact with the physical limiter. Such limiters can be employed throughout the master control arm and/or the slave arm.

In one example embodiment, limits can be implemented via a touch screen mounted near the operator or elsewhere on the system 100 (FIG. 1). Alternatively, a graphical user interface in an application on the operator's smart phone, tablet, or other portable computing device can be used to wirelessly communicate limitations to the system.

In another aspect, the user can control the positional boundaries of the workspace, for example to limit the workspace to something smaller than the actual full reach of the slave arms. For example, if the system 100 is operating in an area with a low ceiling, the system can be configured by the user to not reach higher than the height of the low ceiling to avoid contact with the ceiling. The limitations may be applied to the master control arm, the slave arm, or both. This will be discussed further hereinafter.

Figure 3A:
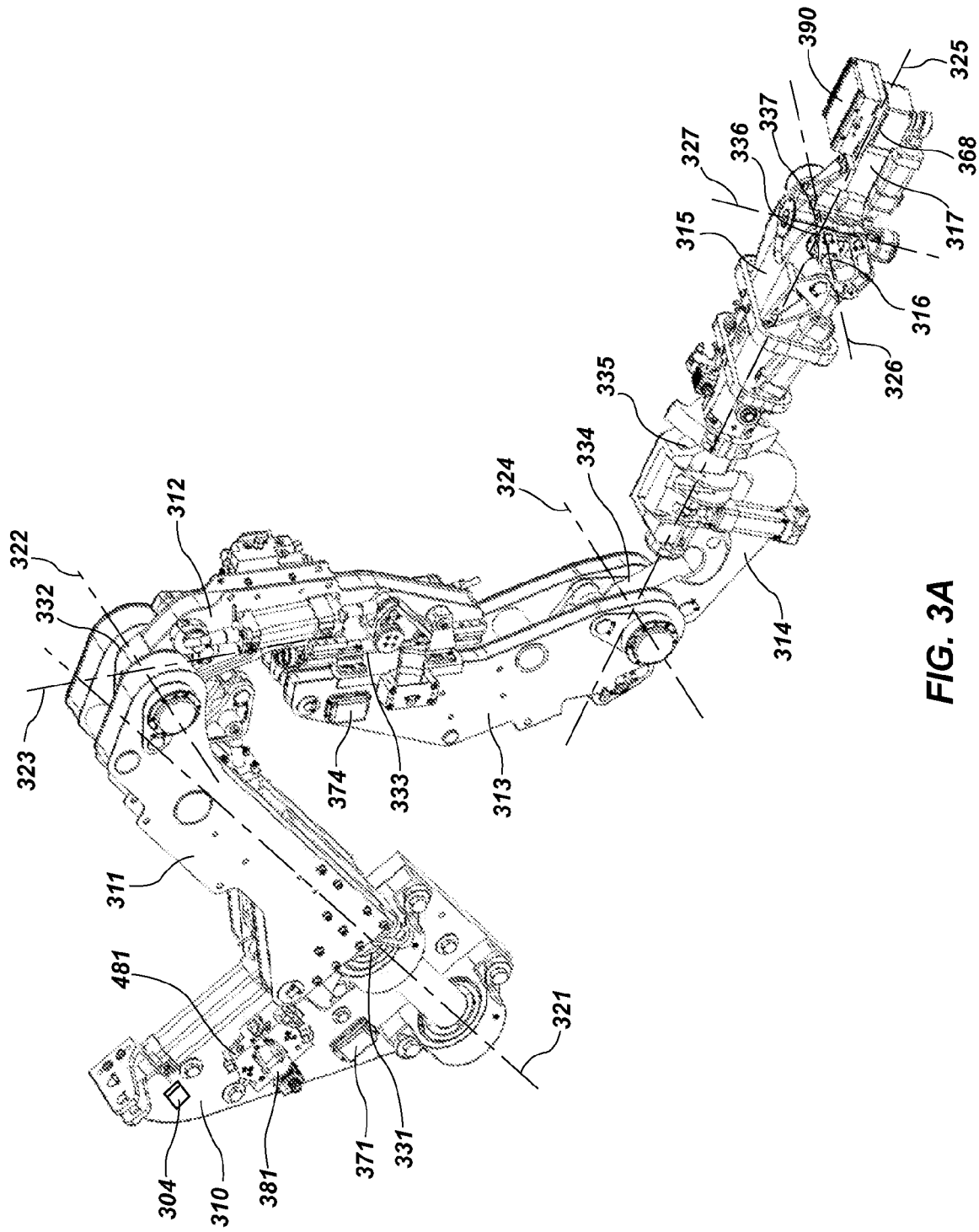
FIG. 3A is an example illustration of a slave arm of the robotic agile lift system in accordance with an embodiment of the present invention.

One example of the robotic slave arm 300A is illustrated in FIG. 3A. For simplicity, slave arm 300A is shown independent of other components of the robotic system, such as master control arms 200A, 200B, slave arm 300B, and platform 400. The slave arm 300A can be mounted, installed, or otherwise associated with any platform of the present disclosure such that the platform supports the slave arm. Typically, the slave arm is supported by the platform in a manner that allows the slave arm to interact with objects in a workspace or operating environment of the tele-operated robot.

As mentioned above, in one aspect, a master control arm 200A can be kinematically equivalent to a user's arm from the shoulder to the wrist. In another aspect, the slave arm 300A can be kinematically equivalent to the master control arm. Thus, the master control arm and the slave arm can be kinematically equivalent to the user's arm from the shoulder to the wrist. In the examples of FIGS. 2A and 3A the master control arm 200A and slave arm 300A include seven degrees of freedom, the same number as the human arm from the shoulder to the wrist. However, as previously discussed, some embodiments may not include each of the three degrees of freedom in the wrist, while substantially maintaining the kinematic equivalence between the human arm, master control arm, and slave arm.

The slave arm 300A can be configured as a kinematic system to include DOF and linkages that correspond to the DOF and linkages of the master control arm 200A and a human arm from the shoulder to the wrist. In one aspect, the lengths of the linkages of the slave arm are proportional to corresponding linkage lengths of the master control arm.

In general, the master control arm is configured to interface with a human user, thus certain of the structural features and characteristics may be the result of this objective. In some cases, remnants of these structural features and characteristics may be carried over and incorporated into the slave arm 300A, in order to maintain or enhance kinematic equivalency. For example, as shown in FIG. 3A, axis 321 is at about a 45 degree angle relative to a horizontal plane. This configuration may not be necessary for a functional slave arm but it is similar to that of the master control arm and contributes to kinematic equivalency between the master control arm and the slave arm. In other cases, some structural features and characteristics of the master control arm that facilitate the human interface may not be incorporated into the slave arm. For example, the slave arm can operate effectively, both as a functional slave arm and as a kinematic equivalent to the master control arm, without incorporating the structure of the master control arm corresponding to the user's wrist DOF. Such structure could unnecessarily inhibit or constrain operation of the slave arm. Thus, in some instances, the structure and apparatus of the slave arm may be more simplified or more closely replicate a human arm, than corresponding structure of the master control arm.

A first support member 311 is coupled to base 310 at joint 331, which enables rotation about axis 321. Axis 321 provides a rotational DOF corresponding to axis 221 of the master control arm and abduction/adduction of the human shoulder. As mentioned above, a first support member 311 can extend from the base 310 to position joint 332 proportional to the corresponding features of the master control arm. Joint 332 is coupled to a second support member 312 and forms axis 322, which provides a rotational DOF corresponding to axis 222 of the master control arm and flex/extend of the human shoulder.

The second support member 312 extends from the joint 332 and is coupled to a third support member 331 by joint 333, which forms axis 323. Axis 323 provides a rotational DOF corresponding to axis 223 of the master control arm and humeral rotation of the human shoulder. Thus, the slave can include three separate joints that correspond to the three separate joints of the master control arm, which correspond to the single joint of the human shoulder in kinematically equivalent systems.

The second support member 312 and the third support member 313 combine to form a linkage between axis 322 and axis 324 that corresponds to the linkage formed by second support member 212 and third support member 213 of the master control arm and to the human upper arm. The third support member 313 is coupled to a fourth support member 314 by joint 334, which forms axis 324. Axis 324 provides a rotational DOF corresponding to axis 224 of the master control arm and a human elbow.

The fourth support member 314 is coupled to a fifth support member 315 at joint 335, which forms axis 325. Axis 325 provides a rotational DOF corresponding to axis 225 of the master control arm and human wrist rotation. The fifth support member 315 is coupled to a sixth support member 316 at joint 336, which forms axis 326. Axis 326 provides a rotational DOF corresponding to axis 226 of the master control arm and human wrist abduction/adduction. The sixth support member 316 is coupled to a seventh support member 317 at joint 337, which forms axis 327. Axis 327 provides a rotational DOF corresponding to axis 227 of the master control arm and human wrist flex/extend.

In one aspect, the DOF structure of the slave arm 300A more closely resembles the DOF of the human wrist compared with the structure of the master arm 200A. For example, the DOF about axis 325 is similar to a human wrist in that the DOF structure is located in the "forearm" of the slave arm. Likewise, the DOF about axes 326, 327 of the slave arm is similar to a human wrist in that the DOF structure is located in the "wrist" of the slave arm. Thus, the structure forming axes 325, 326, 327 of the slave arm more closely resemble a human wrist than the corresponding structure of the master control arm. In spite of the various similarities and differences, kinematic equivalency with the human arm can exist across the two systems.

Figure 3B:
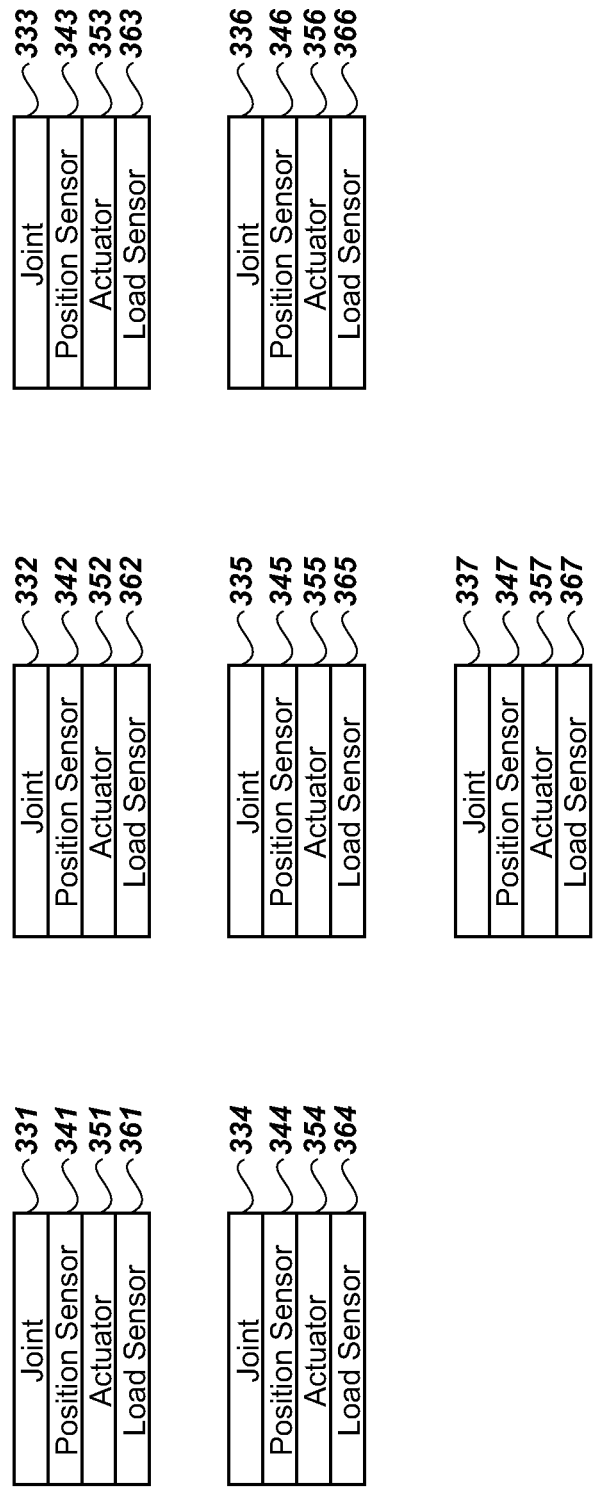
FIG. 3B is an example list of sensors employed in the slave arm in accordance with an embodiment of the present invention.

Each joint 331-337 in the slave arm 300A can be associated with a position sensor 341-347, an actuator 351-357, and a load sensor 361-367, respectively, as illustrated in FIG. 3B. The way in which the load sensor, position sensor, and actuator are coupled to the joint is dependent on the design of the slave arm, the type of locomotive force (i.e. electrical, hydraulic, or pneumatic), and the types of sensors used.

With reference to FIG. 3A and 3B, the actuators 351-357 are associated with the DOF of the slave arm 300A. The actuators can be used to cause rotation about a given DOF axis of the slave arm based on a change of position of the master control arm, discussed further below. The actuators can also be used to enable gravity compensation of the slave arm, as discussed further below.

In one aspect, there is one actuator for each DOF of the slave arm 300A. The actuators can be linear actuators, rotary actuators, etc. The actuators in FIG. 3A, for example, are linear actuators that couple with linkages to cause rotation about the DOF axes of the slave arm. The actuators can be operated by electricity, hydraulics, pneumatics, etc. The actuators at the slave arm can be configured to actuate a much heavier load than the actuators at the master control arm 200A. For instance, the actuators at the master control arm may be limited to providing less than 100 foot pounds of torque, while the actuators at the slave arm may provide thousands of foot pounds of torque to enable the slave arm to lift hundreds or even thousands of pounds.

Each actuator 351-357 may be controlled using an electric motor. Alternatively, hydraulic or pneumatic servo valves can be opened or closed to enable a selected amount of hydraulic or pneumatic fluid to apply a desired level of force to the actuator to apply a torque to the corresponding joint. In one embodiment, a pair of servo valves can be associated with each actuator, enabling one of the valves to open to apply a desired torque to the actuator in a selected direction. The other valve can be opened to apply force in the opposite direction. The slave arm 300A can include servo valve pairs 381, 382, 383, 384, 385, 386, and 387 that are each hydraulically or pneumatically coupled to an actuator 351-357.

FIG. 3A only displays servo valve 381, as the other valves are located on the hidden side of the slave arm. However, a similar servo valve pair is coupled to each actuator. One type of servo valve that can be used is manufactured by Vickers under part number SMS-10(5)19-200/20-10S39. Another type of servo valve that can be used is manufactured by Moog, model 30-400A. Additional types of servo valves may be used based on design considerations including the type of valve, the pressure at the valve, and so forth.

Figure 3C:
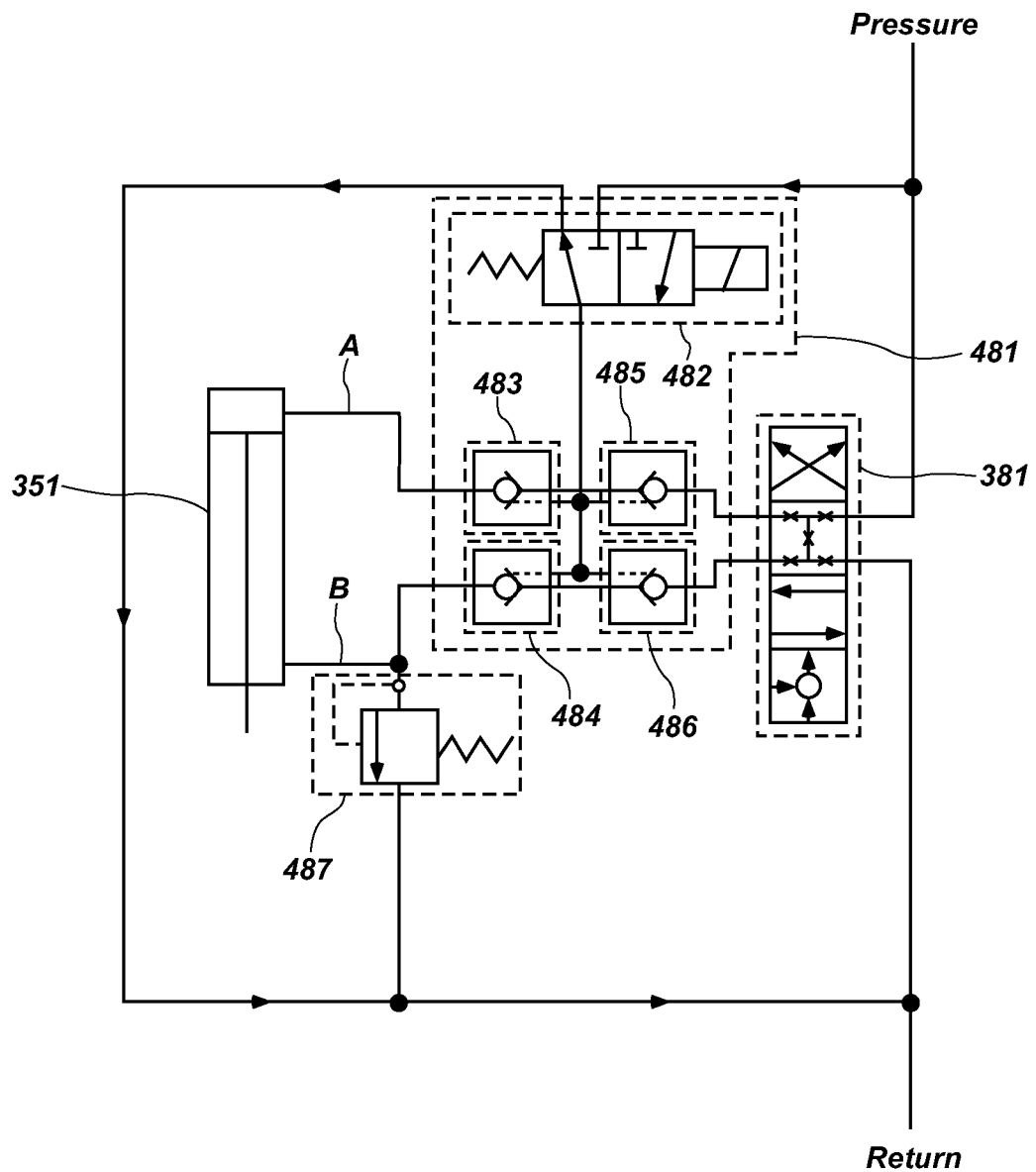
FIG. 3C is a hydraulic schematic of a clamp valve to isolate an actuator from a servo valve, in accordance with an embodiment of the present invention.

As schematically illustrated in FIG. 3C, a clamp valve 481 can be used to fluidly isolate actuator 351 from servo valve 381 associated with actuator 351. In other words, the clamp valve 481 can function to lock the actuator 351 to prevent movement of the associated DOF for safety and other reasons. Thus, in one aspect, clamp valves can be used as a safety measure in case of a hydraulic or electrical system failure. In another aspect, clamp valves can be used to lock the slave arm in position while supporting a payload. For example, the slave arm can lift and manipulate an object into a desired position. Once the object has been properly positioned by the slave arm, clamp valves can lock the slave arm in that position indefinitely to perform the intended task. Once the desired task has been completed, the clamp valves can be caused to allow the slave arm to again move as actuated under servo valve control. The clamp valve can be automatically controlled, such as in a safety feature that locks the slave arm when a preset condition has been satisfied, or user controlled, such as by a switch or other means when the user desires to lock the slave arm to weld or perform some other task. Clamp valves can be utilized at any slave arm DOF and in any slave arm DOF combination. Of course, clamp valves can also be employed on the master control arm as will be appreciated by those skilled in the art.

The servo valve 381 can be fluidly connected to "A" and "B" sides of the actuator 351. The clamp valve 481 can operate to open or close the "A" and "B" connections. The clamp valve 481 can include a directional valve 482 having three ports and two discrete positions. As shown, the directional valve is in a normally closed position and is solenoid controlled with a spring return to closed position. The directional valve 482 acts as a pilot valve for check valves 483, 484, 485, 486. The check valves require pilot pressure to open. Check valves 483, 485 are coupled to the "A" connection and check valves 484, 486 are coupled to the "B" connection. A pressure relief valve 487 in a normally closed position can also be included.

In operation, pressure from the servo valve 381 through the "A" connection is blocked by check valve 485 unless the solenoid of the directional valve 482 has been actuated to provide a pilot pressure to open the check valve 485. Once check valve 485 has been opened, pressure can be delivered to the "A" side of the actuator 351 to cause the actuator to move. Similarly, check valve 486 blocks the servo valve 381 "B" connection unless the directional valve 482 has been actuated to provide a pilot pressure to open the check valve 486. The directional valve 482 must be actuated to provide a pilot pressure for check valves 485, 486 in order for the servo valve 381 to control the actuator 351. Likewise, check valves 483, 484 block flow from the actuator 351 to the servo valve 381 through the "A" and "B" connections, respectively, unless the solenoid of the directional valve 482 has been actuated to provide a pilot pressure to open the check valves 483, 484. When the check valves 483, 484 are closed, the actuator 351 is locked in position. The directional valve 482 is connected to the check valves 483, 484, 485, 486 such that all the check valves are open or closed at the same time. Therefore, when the solenoid of the directional valve is actuated to provide a pilot pressure to open the check valves, the "A" and "B" connections are open and the servo valve 381 can control the movement of the actuator 351. On the other hand, when the solenoid is not actuated and the check valves are closed, the "A" and "B" connections are blocked and the servo valve 381 cannot control movement of the actuator 351 and the actuator is locked in position. Thus, the clamp valve 481 can fluidly isolate the actuator 351 from the servo valve 381. It should be recognized that the clamp valve in this example can be coupled with any servo valve and actuator of the slave arm or master control arm discussed herein. Additionally, the pressure relief valve 487 can be set to open at a predetermined pressure to prevent damage to the actuator, clamp valve components, and/or connecting lines therebetween.

Referring again to FIGS. 3A and 3B, the slave arm 300A can include position sensors 341, 342, 343, 344, 345, 346, 347 on the slave arm 300A. The position sensors are associated with the joint of the slave arm that provides a DOF. In one aspect, there is one position sensor for each DOF. The position sensors can be located, for example, at each of the joints 331, 332, 333, 334, 335, 336, and 337. Because the DOF of the slave arm at these joints are rotational, the position sensors can be configured to measure angular position. The position sensor can be encoders configured to provide an absolute position, as previously discussed.

In one aspect, the position sensors 341-347 can detect a change in position of the slave arm at each DOF, such as when the actuators cause rotation about the joint. When the position of the joint for each segment in the slave arm reaches a position proportional to a position of the associated joint in the master control arm 200A at the corresponding DOF, the actuators in the slave arm 300A substantially cease causing movement of the slave arm. In this way, the position of the master control arm can be proportionally matched by the slave arm.

The position sensors 331-337 can include any type of suitable position sensor including, but not limited to, encoders. In one embodiment, the position sensors at the slave arm may be the same type of position sensors used at the master arm to enable measurements taken by each position sensor to more closely correspond. As discussed with respect to the master control arm, examples of position sensors that can be used an encoder disk produced by Gurley Precision Instrument, Manufacturer P/N AX09178. The encoder disk can be coupled to each joint 231-237 in the master control arm. An encoder reader produced by Gurley Precision Instrument, P/N 7700A01024R12U0130N can be used to read the encoder disk to provide an absolute position reading at each joint.

The slave arm 300A can also include load sensors 361, 362, 363, 364, 365, 366, 367. The load sensors are associated with the joints of the slave arm that provide a DOF. The load sensors can be used to measure loads in the slave arm, which can be proportionally reproduced by the actuators of the master control arm. In this way, loads "sensed" at the slave arm can be transmitted to the master control arm and, thus felt by the user. This force reflection aspect thus includes the slave arm controlling the master control arm via the force commands. The load sensors can also be used to enable gravity compensation of the slave arm. The load sensors can also be used to enable a user to instruct the slave arm, using the master control arm 200A, to apply a predetermined amount of force at a selected location using the slave arm. The load sensors at the slave arm can also be used to directly control the movement of the slave arm without using the master control arm, as will be subsequently discussed.

In one aspect, there is one load sensor 361-367 for each DOF of the slave arm. In another aspect, several DOF of the slave arm can be accounted for with a multi DOF load sensor. For example, a multi DOF load sensor capable of measuring loads in six DOF could be associated with axes 325, 326, 327, which correspond to the wrist DOF of the user and axes 321, 322, 323, which corresponds to the shoulder DOF of the user. A single DOF load sensor can be associated with axis 324, which corresponds to the elbow DOF of the user. Data from the multi DOF load sensors can be used to calculate the load at a DOF between the load sensor location and the base 310.

The load sensors 361-367 can be located, for example, at each support member 311-317 of the slave arm. In one aspect, the load sensors 361, 362, 363, 364, 365, 366, 367 can be associated with the actuators 351, 352, 353, 354, 355, 356, 357, as illustrated in FIG. 3B.

Additionally, load sensors can be located at other locations on the slave arm. For example, a load sensor 368 can be located on seventh support member 317. Load sensor 368 can be configured to measure loads acting on the seventh support member 317 through end effector 390. Load sensor 368 can be configured to measure load in at least one DOF, and in one aspect, is a multi DOF load sensor. End effector 390 can be located at an extremity of the slave arm and can be configured to serve a variety of uses. For example, the end effector can be configured to secure a payload for manipulation by the slave arm. Thus, load sensor 368 can measure loads imparted by the payload and the end effector on the seventh support member 317. Load data acquired at the end effector can be used to enhance the ability of the slave arm to support and maneuver the end effector and payload.

The load sensors can include a sensor capable of converting a rotational torque into an electrical signal, including, but not limited to, a strain gauge, a thin film sensor, a piezoelectric sensor, a resistive load sensor, and the like. For example, load sensors that may be used include load cells produced by Sensotec, P/N AL311CR or P/N AL31 DR-1A-2U-6E-15C, Futek, P/N LCM375-FSSH00675, or P/N LCM325-FSH00672.

The slave arm 300A can also include at least one gravity sensor 304. In one embodiment, a separate gravity sensor can be associated with each separate axis of the slave arm. Alternatively, a single gravity sensor can be used. The gravity sensor(s) can be used to measure the gravity vector relative to the platform on which the slave arm is located or relative to each of the axes of the slave arm. The gravity sensor measurement can be used to enable gravity compensation of the slave arm and the master control arm 200A. In the case of multiple slave arms 300A, 300B (FIG. 1), a separate gravity sensor may be coupled to each slave arm. Alternatively, a single gravity sensor can be coupled to the base 400 and used with respect to both slave arms 300A and 300B. The gravity sensor(s) can include any type of suitable gravity sensor including, but not limited to, at least one of a tilt sensor, an accelerometer, a gyroscope, and an inertial measurement unit. One example of a gravity sensor that can be used is produced by Microstrain, Inc., P/N 3DM-GX1-SK.

The kinematic equivalency of the master control arm 200A with both a human arm and the slave arm 300A provides a very intuitive system that is simple for a user to control. The use of force feedback from the slave arm to the master control arm significantly enhances the ability of the user. Force feedback can also be referred to as force reflection.

The user's ability to feel the loads that occur at the slave arm enables the user to react to the loads in a natural way. This allows the slave arm to be used as a high fidelity, dexterous manipulator in a complex environment. If the slave arm comes into contact with a surface or an object, the user can feel the contact and respond accordingly. The kinematic equivalency of the system enables the natural response of the user to an unexpected event to move the slave arm in a desired direction through the user's natural reflexive reaction. For example, when a person bumps his or her arm into a surface the natural reflexive reaction is to move the person's arm away from the surface. If the robotic system was not kinematically equivalent to the user's arm, the user's natural reflexive reaction may inadvertently move the arm in an incorrect direction, potentially causing damage. The use of a kinematically equivalent system employing force feedback enables the user's reflexive reactions to be mirrored at the slave arm, thereby protecting both the slave arm and any load supported by the slave arm from potential damage due to the user's natural reflexive reaction.

The ability to provide force reflection from the slave arm to the master arm is significantly enhanced through the use of gravity compensation of the slave arm. A relatively long slave arm, such as 4 to 10 feet in length, can weigh hundreds of pounds. When the slave arm is used to pick up objects that weigh less than the slave arm, the change in mass of the slave arm is relatively small, relative to an unloaded arm. The small change in mass may not provide significant feedback.

To overcome the reduced sensitivity that can be caused by gravitational forces, the slave arm can be gravity compensated. Gravity compensation involves measuring the effects of gravity on each support member and adjusting the torque at each DOF to compensate for the effects of gravity. In one embodiment, each support member can include a separate measurement device that is used to determine the direction of the gravitational pull (i.e. the gravity vector) relative to a center of gravity of the support member. Alternatively, a single measurement may be taken with respect to a fixed frame of reference for the arm, such as the base on which the arm is located. A transformation of the frame of reference can then be calculated for each support member and a determination can be made as to the level of torque needed at each DOF to compensate for the gravitational pull based on the position, center of gravity, and mass of the support member.

In one embodiment, a single measurement of the gravity vector with respect to a fixed location relative to the slave arm 300A can be acquired using a gravity sensor 304 such as an inertial measurement unit. In a multi-axis system, such as the slave arm 300A having seven different support members 311-317, the force and torque at each of the respective joints 331-337 that is caused by gravity acting on each member can be calculated.

For example, a determination of the torque caused by the gravitational force at each joint 331-337 of a support member 311-317 can be determined using the Iterative Newton-Euler Dynamic Formulation. The velocity and acceleration of each support member can be iteratively computed from the first support member 311(axis 321) to the last support member 317 (axis 327). The Newton-Euler equations can be applied to each support member. The forces and torques of iteration and the joint actuator torques can then be computed recursively from the last support member back to the first support member based on a knowledge of the mass of each segment, its center of gravity, and its position. The position of each support member can be determined using a position sensor such as an encoder, as previously discussed. The Newton-Euler equations are well known. The effect of gravity loading on the segments can be included by setting the acceleration of the fixed location, such as the base of the slave arm, equal to the acceleration due to gravity along the gravity vector measured by the inertial measurement unit.

While the Iterative Newton-Euler Dynamic Formulation has been provided as one example of gravity compensation, it is not intended to be limiting. There are a number of different ways to incorporate gravity compensation in a robotic system. Any gravity compensation scheme that can be used to calculate torque values that can be used to compensate for the effects of gravity on the slave arm is considered to be within the scope of the present invention.

Once the amount of force caused by the measured gravitational vector is calculated at each joint 331-337, the force can be compensated for by applying an opposite force to effectively compensate for the force of gravity. The opposite force may be applied using an electric motor connected to each joint, or through the use of pneumatic or hydraulic valves 381-387 connected to actuators 351-357, as previously discussed. The same gravity sensor 304 can be used to compensate two or more slave arms, such as the slave arms 300A and 300B illustrated in FIG. 1.

Each master control arm 200A, 200B can also be configured to be gravity compensated. Gravitational compensation of the master control arm can have a number of benefits. A complex, kinematically equivalent control arm may have a significant weight. If a user had to lift the weight of the control arm to control the slave arm, the can become quickly fatigued. Gravity compensating the control arm can allow a user to utilize the control arm for extended periods without fatigue.

Moreover, the master control arm, such as the example arm 200A illustrated in FIG. 2A, can be configured to also compensate for the weight of the user's arm. For instance, to obtain the desired movement of the slave arm while unloading a shipment of 200 pound widgets from a shipping truck, the user's arm may be extended for a significant length of time. The angle of extension of the user's arm may cause the user to fatigue. To enable the user to control the slave arm 300A for extended periods, the control arm 200A can be configured to support the weight of the user's arm, allowing the user to manipulate the slave arm while minimizing the use of muscles needed to extend the user's arm.

Another advantage of gravitationally compensating the master control arm is to increase the sensitivity of the force feedback at the master control arm that is sent from the slave arm. For example, the slave arm may be set to have a load gain of 40 to 1 relative to the master control arm. When an operator uses the master control arum to instruct the slave arm to pick up a 100 pound object, the force feedback will increase the torque at one or more of the joints 231-237 in the master control arm to simulate picking up approximately 2.5 pounds. Without gravity compensation, the master control arm itself may weigh 60 pounds. The relatively small change in weight (to 62.5 pounds) in the master control arm may be difficult to detect. However, with gravity compensation, the 2.5 pound change will be easily detectable to the user. Thus, gravity compensation of the master control arm enables the use to more accurately detect force feedback from the slave arm.

Gravity compensation of the master control arm can be accomplished in the same fashion as previously described with respect to the slave arm. The Iterative Newton-Euler Dynamic Formulation may be used in conjunction with an inertial measurement unit that is coupled to a fixed location to calculate the effects of gravity on each segment of the master control arm. In one embodiment, the same inertial measurement unit that is used to provide gravity vector measurements for the slave arm can also be used for the master control arm, assuming the master control arm and slave arm are mounted to the same base. In another embodiment, if the master control arms are portable (i.e. can be removed from the base), each master control arm can include at least one gravity sensor to determine a gravity vector.

Once the amount of torque caused by the measured gravitational vector is calculated at each joint 231-237, the torque can be compensated for by applying an opposite torque (i.e. force) to effectively compensate for the force of gravity. The opposite force may be applied using an electric motor connected to each joint, or through the use of hydraulic or pneumatic valves connected to each of the actuators, as previously discussed. The same electric motors and/or actuators can be used to provide both the gravity compensation as well as the force feedback in the master control arm.

In one aspect, a payload supported by the slave arm, such a payload coupled to the end effector 390, can be gravity compensated so that the user does not feel the weight of the payload while operating the master control arm. Payload gravity compensation can utilize load sensor 368 coupled to the end effector and the slave arm to determine the weight of the payload to be compensated.

An explanation of the functionality of the tele-operated robotic system will be provided, with respect to the examples of the robotic system that are illustrated in the previously described figures. A more detailed explanation of the control of the master control arm and the slave arm will then be presented.

A user can utilize one or more master control arms, such as the example master control arm 200A illustrated in FIG. 2A to control one or more slave arms (e.g., 1 to 1, 1 to n, n to 1, n to n, n to m and/or m to n ratios), such as the slave arm 300A illustrated in FIG. 3A. The tele-operated system can be activated and powered up. The system can include a power up sequence in which the master control arm and the slave arm are aligned to be in substantially the same relative position. In one embodiment, the master control arm can be aligned with the position of the slave arm so that the slave arm is not inadvertently moved in an undesired direction at power-up. In another embodiment, the master control arm position can be "faded" to the position of the slave arm and/or the slave arm "faded" to the position of the master control arm at power-up. Fading of torque between the master control arm and the slave arm can also be incorporated to contribute to a smooth power-up transition.

The user can then use his or her arm to move the master control arm in the direction in which it is desired to move the slave arm. The movement of the master control arm will be followed by the slave arm. The slave arm can be controlled using a number of different types of controls. The controls are selected to allow the slave arm to quickly follow the movements of the master arm with limited lag. In some cases, large lag (i.e. slew) times with force feedback can be dissociative to the user and cause nausea to the user if the feedback lags the motion by more than a few hundred milliseconds.

Figure 4A:
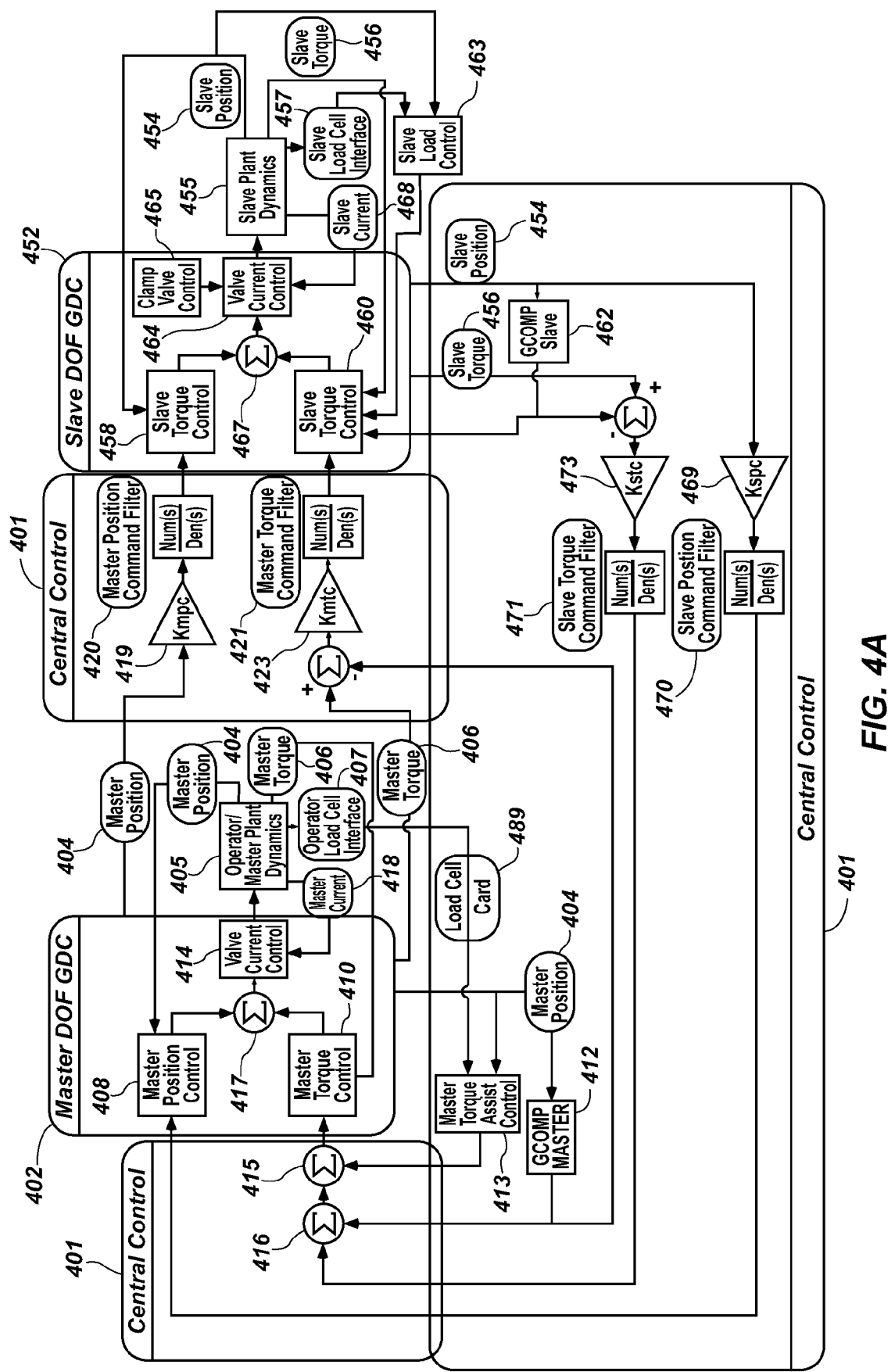
FIG. 4A is an example block diagram of a control system for the robot system in accordance with an embodiment of the present invention.

FIG. 4A provides an illustration of an example block diagram for controlling the tele-operated robotic agile lift system comprising the master control arm and the slave arm. A separate master General Degree of Freedom (DOF) Controller (GDC) 402 can be associated with each joint providing a DOF in the master control arm. The master GDC represents the GDCs 271-277 illustrated in FIG. 2A. Similarly, a slave GDC 452 is associated with each joint providing a DOF in the slave arm. The slave GDC represents the GDCS 371-377 illustrated in FIG. 3A. For the sake of simplicity, the subsequent examples will be provided with regards to a single master joint 231 and the corresponding slave joint 331, and the sensors and valves associated with the joints in the master and slave, as illustrated in FIGS. 2A, 2B, 3A, and 3B. However, a separate GDC is in communication with the sensors and valves for each joint providing a DOF in the master control arm and the slave arm, as previously described.

The GDC is configured to provide a control system that is used to control the position and torque of the joint 231 on the master control arm 200A as well as the associated joint 331 on the slave control arm 300A. The GDC employs, for example, a number of different closed loop control schemes. Each scheme is designed to provide a desired level of accuracy, speed, and stability to provide a tele-operated robotic agile lift system that is both fast and accurate. The control system for each support member 211-217 of the master control arm 200A and each support member 211-217 of the slave arm 300A is designed to limit or eliminate signals sent to each segment that allow operation at a frequency that may induce a natural resonant harmonic on another support member. Filtering of output signals and feedback signals is performed to remove high frequency signals that may induce resonance in a support member or other types of non-stable performance. The GDC can be updated at a rate that will allow the commands from the master control arm 200A to pass to the slave arm 300A at a speed sufficient to enable the slave arm to closely follow the motion of the master control arm. For example, in one embodiment each GDC may be updated at a rate between 1,000 times per second to 5,000 times per second. However, the actual rate may be less than or greater than this range, depending on the design and use of the system 100.

The master GDC 402 in the master control arm 200A can receive an input from the sensors associated with the joint 231, as well as signals (via the central controller 401) from the sensors that are in communication with the slave GDC 452 on the associated joint 331 on the slave arm 300A. Inputs are also received at the master GDC 402 from the user (operator). The slave GDC 452 receives inputs from the master GDC (via the central controller 401) at the associated joint 231 in the master control arm, as well as inputs from the sensors coupled to the joint 331 at the slave arm which the GDC is coupled to. The inputs are used to determine the desired position and torque for the joints 231 and 331 associated with the GDCs at the master and slave, respectively. Each GDC then outputs a signal to a controller used to actuate a motor or valve to apply a desired level of torque to the joint. In the example of FIG. 4A, the signal is output to a valve current control 414. The torque may be used to move the joints 231, 331 by a desired amount.

In one aspect, however, a clamp valve 481 can prevent or allow movement of the slave arm joint 331 by fluidly isolating or coupling, respectively, the servo valve 381 and the actuator 351, as discussed above with reference to FIG. 3C. As shown in FIG. 4A, slave arm valve current control 464 can be in communication with a clamp valve control 465, which can prevent or allow movement of joint 331. For example, at system start-up, the clamp valve control can allow movement of joint 331. In another example, the clamp valve control 465 can receive a command from the user, via a user interface on the master control arm or a control panel, to prevent movement of the slave arm. One or more slave arm DOF can be "locked up" by such a command. In yet another example, the clamp valve control 465 can lock up one or more slave arm DOF to maintain a range of motion limitation or a load limitation of the slave arm, as discussed herein.

In the example block diagram illustrated in FIG. 4A, an operator can use his or her arm to apply a load to the master control arm 200A to move the arm in a desired direction. Each master GDC 402 will output a master position value 404 and a master torque value 406. These values will be sent to a master position control 408 and a master torque control 410 in the master GDC 402. The values will also be sent to the slave position control 458 and slave torque control 460 in the slave GDC 452. The signals sent to the slave GDC will be filtered and amplified. This will be subsequently described more fully.

The master position value 404 is also sent to the GCOMP master 412. This position value can be used to determine the position of the support member 211. The GCOMP master 412 can output the necessary torque to substantially compensate for the effects of gravity on the joint 231 at the desired position. The output of the GCOMP master is then summed 416 and sent to the master torque control 410.

An operator load cell interface 407 can be used to provide an additional means for the user to direct the control arm 200A, such as by torque assistance. In the example of FIG. 2C, two separate load cells 268 and 269 are illustrated. The load cell interface can be a multi DOF load cell. When a load, such as a user's arm, is placed on the load cell the load can be measured at the load cell for each of the degrees of freedom. Each load cell can output a signal that is proportional to the amount of load and direction of load that is applied to the load cell.

In one example embodiment, the load cell may have six degrees of freedom. The six degrees of freedom can include x, y, and z axis degrees of freedom and a moment degree of freedom for each axis to measure rotation (torque) about the axis. In one embodiment, the load cell 268 (FIG. 2C) can be in communication with the wrist joints 235, 236 and 237 in the master control arm. The load cell 269 can be in communication with the shoulder joints 231, 232 and 233. Alternatively, the load cell 268 can be in communication with joints 231-237 and load cell 269 can be in communication with a limited subset of these joints to optimize control of the master control arm.

Returning to FIG. 4A, the signals from the load cells can be communicated to the load cell card 489. The load cell card can communicate the signals to the master torque assist control 413, which can scale the torque values sufficient to assist the user to move the master control arm. Typically, the torque values applied are insufficient to move the master control arm without assistance from the user. The torque values for each joint 231-237 associated with one of the DOF of the load cell can be summed 415 with the torque outputs of the GCOMP master 412 and the torque from the slave torque command filter 471. The torque values can assist the user in moving the master control arm in a direction indicated by the user through the multi DOF load cells and still allow the user to sense the torque in the slave arm due to the slave torque command filter 471 contribution. While two multi DOF load cells have been described, a greater or smaller number of load cells may be used, depending on the amount of torque assist that is desired at the master control arm.

The master position control 408 and the master torque control 410 can each use a lag lead compensator to determine an output to the valve current control 414. The outputs of the two controls are summed 417. A lag lead compensator is selected to improve an undesirable frequency response in the feedback of the control system. The master position control 408 uses position feedback from the position sensor 241. The master torque control 410 uses torque feedback from the load sensor 261 on the actuator 251.

A phase lag section of the lag lead compensator can be designed to maintain low frequency gain while realizing a part of the gain margin. A phase lead section of the compensator can then realize the remainder of the phase margin, while increasing the system bandwidth to achieve a faster response.

In some cases, a compromise may be necessary. If either the specified phase margin or the compensator gain can be reduced, the high frequency gain of the compensator can also be reduced. If these specifications cannot be reduced, it may be necessary to employ a section of phase lag compensation cascaded with a section of phase lead compensation.

Figure 4B:
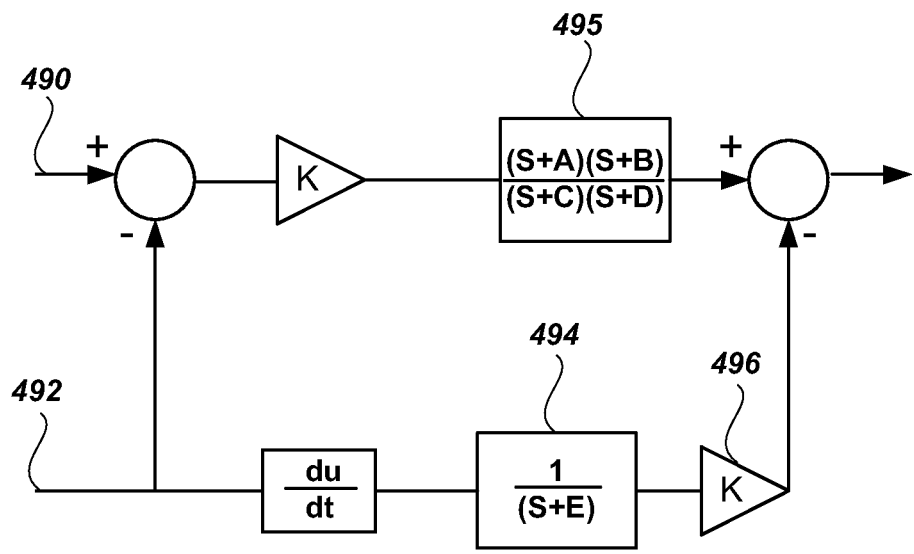
FIG. 4B is an example of a transfer function block diagram for a lag lead system with derivative feedback for the robot system in accordance with an embodiment of the present invention.

FIG. 4B provides an example of a Laplace domain transfer function block diagram for a lag lead system with derivative feedback. The position or torque command 490 and the measured position or torque value 492 is input. A lag lead gain value "K" is selected. Zero values "A" and "B" and pole values "C" and "D" are selected. The A and C values are the lead compensator and the B and D values are the lag compensator. The lead compensator provides a phase lead at high frequencies. This effectively shifts the poles to the left, which enhances the responsiveness and stability of the system. The lag compensator imposes a penalty of phase lag at low frequencies in order to eliminate or minimize steady state error. The actual location of the poles and zeroes depends on the desired characteristics of the closed loop response and the characteristics of the system being controlled.

A derivative of the measured position or torque value, du/dt, is calculated and filtered using the derivative filter 494. The derivative filter can be a single pole filter used to remove high frequency components. High frequency components, such as frequencies greater than 10 Hz, can be considered to be anomalous signals that could cause unwanted vibrations in the master control arm. A derivation gain 496 is then applied to the filtered signal. The output is then subtracted from the output of the transfer function 495. The output of the master position control 408 and the master torque control 410 is then sent to the valve current control 414, as previously discussed.

It should be understood that a separate GDC 271-277 (FIG. 2A) is coupled to each joint providing a DOF in the master control arm 200A. Each support member can have different characteristics, such as size, mass, and center of gravity. Thus, different filter values and different gains for the lag lead filter in the master position control can be selected for each joint based on the physical characteristics of the support member connected to the joint, its natural resonant frequency, its location in the master control arm, and other design characteristics, as can be appreciated.

The signals sent to the valve current control 414 from the master position control 408 and the master torque control 410 can be controlled using a Proportional-Integral-Derivative (PID) controller that uses current feedback 418. The PID controller takes into account a rate of change of an error between the desired level of valve current and the actual valve current. This difference is referred to as the error. If the measured value approaches the desired level rapidly, then the rate of change in the valve used to control the current flow is backed off early to allow it to coast to the required level. Conversely, if the measured value begins to move rapidly away from the desired level, an extra effort is applied to try to maintain the desired level. In addition, an integral term is used to magnify the effect of long-term steady-state errors. An ever-increasing effort can be applied until the error level approaches zero. The output of the PID controller in the valve current control 414 is sent to the valve 281 to provide the desired level of hydraulic fluid to apply a force to the actuator 251. In response, the actuator 251 may move the joint 231 to the desired position and/or apply the desired level of torque.

It should be understood that in the embodiment shown in FIG. 2A, a separate GDC 271-277 (FIG. 2A) is coupled to each joint providing a DOF in the master control arm 200A. Each support member can have different characteristics, such as size, mass, and center of gravity. Thus, different filter values and different gains for the lag lead filter in the master torque control 410 can be selected for each joint based on the physical characteristics of the support member connected to the joint, its natural resonant frequency, its location in the master control arm, and other design characteristics, as can be appreciated.

The position and torque of each joint 231-237 on the master control arm 200A is similarly updated. The master position 404 and the master torque 406 for each of the joints 231-237 is communicated from the master DOF 402 to the slave DOF 452 for each joint. The signals may be directly communicated from each master DOF 271-277 for joints 231-237, respectively, to the corresponding slave DOF 371-377 for joints 331-337, respectively, at the slave arm 300A. Alternatively, each of the master DOFs and slave DOFs may be in communication with the central controller 401. The central controller may be a real time controller. The central controller may use a central processing unit (CPU) such as an Intel Core Duo that is configured to run on an operating system such as LINKS 5.0. The central controller can be used to direct communications between the GDCs. In addition, the central controller can be used to perform filtering on the master and slave cross position and torques. The central controller can operate at a speed that is sufficient to enable the slave arm 300A to quickly follow the motion of the master control arm 200A. For example, the central controller can communicate with each GDC at a frequency that is sufficient to enable each GDC to be updated at a rate between 1,000 times per second to 5,000 times per second. However, the actual rate may be less than or greater than this range, depending on the design and use of the system 100.

The Operator/Master Plant Dynamics block 405 represents the physical characteristics, inputs to the master control arm 200A, and the response of the master control arm and the operator. The slave arm 300A is typically connected to an end effector that is selected for a particular job. For instance, a simple end effector may be a closeable jaw to pick up objects.

The central controller 401 can perform filtering on the master and slave cross position and torques. The master position 404 selected by the user can be output to a master position command filter 420. The master position command filter can be a lag lead compensator that can be used to remove high frequency signals and provide improved stability margins. The generic filter illustrated in FIG. 4C can represent one example of a transfer function used for lag lead filtering of the signal. The input 491 is the master position 404. A selected cross gain Kmpc 419 (FIG. 4A) for the measured master position is applied, as represented by the value "K". The values of A, B, C, and D in the transform function 493 are frequencies that are chosen for the filter. The actual selected values are dependent on the design of the system, the weight and length of each support member in the slave arm, the load on the arm, various frictional losses, and so forth. Returning to FIG. 4A, the output of the master position command filter 420 is input to the slave position control 458 in the slave GDC 452.

The master position cross gain 419 can be selected to provide a desired level of magnification of the user's movements at the master control arm 200A. For instance, for each degree a user moves a joint 231-237 in the master control arm, the master position cross gain 419 can be set to provide a corresponding movement in the slave arm with a desired ratio. A typical ratio may be 1:1, enabling the slave arm to move at the same rate as the master control arm. However, a ratio of 2:1, 3:1, or higher may be selected to enable a user to make relatively small movements at the master arm while commanding the slave arm to move 2 to 3 times further. This may be helpful to the user when performing repeated movements by limiting the amount of movement of the user to reduce user fatigue. Conversely, the ratio may be set to 1:2, 1:3, or lower when the user is performing delicate tasks. By reducing the ratio, and requiring the user to move further than the corresponding movements of the slave arm, it enables the user to have more fine motor control over delicate tasks. The actual ratio can be set by adjusting the master position cross gain 419 based on the needs and uses of the system and the system operator.

The master position command 420 can provide a positional boundary for the slave arms to alter the zone of operation of the slave arms, for example, to limit the workspace to something smaller than the actual full reach of the slave arms. For example, if the system is operating in an area with a low ceiling, the system can be configured by the user so that the slave arms do not reach higher than the height of the low ceiling to avoid contact with the ceiling. A height limitation or other range of motion limitation that will prohibit the slave arm from extending beyond the imposed limit. Such boundaries or range of motion limitations can be set by adjusting the master position command 420 based on the needs and uses of the system and the system operator.

In another aspect, the master position command 420 can be selected to provide a desired level of offset of the user's movements at the master control arm 200A. For instance, the position of a joint 231-237 in the master control arm can be offset by a predetermined value to position the slave arm at a position that is offset from the master control arm. This can enable the user to operate in a more comfortable position when the slave arms are at a position that would otherwise require the user to be in an awkward or uncomfortable position. For example, the user may be performing tasks that require the slave arm to be elevated for a prolonged period of time. Without an offset level implementation, the user would be required to position the master control arm in an elevated position, as well. However, by utilizing position offset, the user can offset the position of the slave arm relative to the master control arm to allow the user to operate the master control arm with the user's arm in a lowered position while the slave arms remain operational in an elevated position. This can increase comfort and productivity while reducing fatigue and likelihood of operator error. The position offset can be variable and can be controlled by the user (e.g., via a user interface device operable with the control systems of the robotic device) while operating the master control arm.

The position gains may be set so that the slave arm faithfully follows the position of the master control arm by implementing high gains. The master control arm may be configured so as to not have high position gains, which may help to minimize user effort. There is somewhat of a balancing act at work. If the master control arm gains are too low, the operator can lose the proprioception of what the slave arm is experiencing. For example, the slave arm gains can be increased up to acceptable stability limits, while the master control arm gains can be set to optimize the need of the user to sense what the slave arm is experiencing through the master control arm, while minimizing user fatigue.

Low torque gains can allow improved stability margins, particularly when the slave arm comes into contact with a rigid body and when two slave arms are coupled through a "two-handed" lift.

Tuning of position and torque gains for each slave arm DOF is dependent on the stiffness, mass, and inertia any particular DOF experiences. The position of robot arm DOF change as joints move, therefore, the inertia a particular DOF experiences may change significantly throughout a movement of the robotic arm. Since the slave arm can be configured to pick up a payload, the extra mass of the payload can also cause the inertia a DOF experiences to change significantly. Therefore, a given DOF can be tuned with static gains so that it is stable over all joint angles and payloads. However, this can result in sluggish performance in some situations and oscillatory performance in other situations. By accounting for the change in inertia at various joint angles and the change in inertia due to various payloads, the gains can be changed dynamically to optimize performance over the entire operating envelope. Thus, a torque and/or position gain schedule can be implemented to dynamically optimize performance. A gain schedule can include discrete predetermined values referenced in a table and/or values can be calculated from a formula. Changes in inertia can be determined from measured weights, estimated values, or other calculations.

Figure 4C:
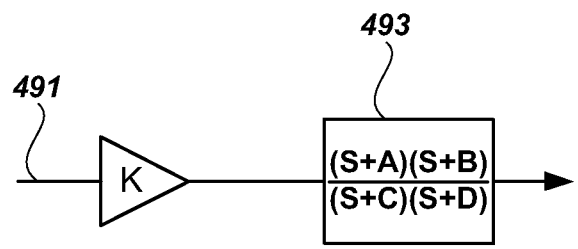
FIG. 4C is a generic filter that can represent an example of a gained two-pole, two-zero filter or an example of a transfer function used for lag lead filtering of a cross signal in accordance with an embodiment of the present invention.
Figure 4D:
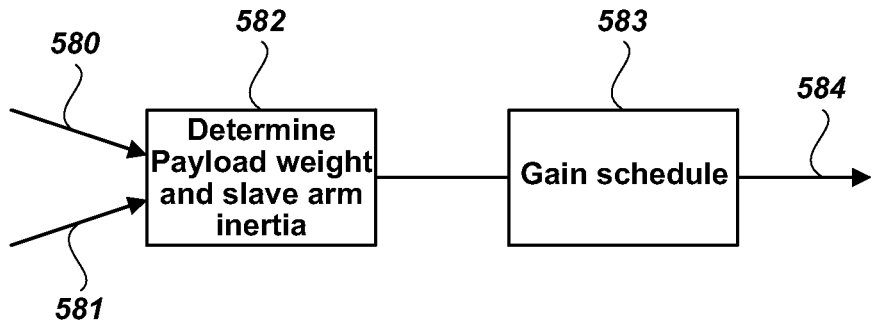
FIG. 4D is an example implementation of a gain schedule in accordance with an embodiment of the present invention.

FIG. 4D illustrates an implementation of a gain schedule. For example, input 580 is the slave torque 456 and input 581 is the slave position 454. Payload weight and slave arm inertia are determined at 582. The gain schedule is applied at 583 and output 584 is sent to the slave torque control 460.

It should be understood that, in the example embodiments discussed, seven separate GDCs 271-277 (FIG. 2A) output seven separate master positions 404 to the master position command filter 420. Thus, seven separate master position and command filters can be used, each with different gains and filter components selected for each separate joint 231-237. The different filter values and different gains can be selected for each joint based on the physical characteristics of the support member connected to the joint, its natural resonant frequency, its location in the master control arm, and other design characteristics, as can be appreciated. The same is true of the other cross filters, including but not limited to the master torque command filter 421 and gain 423, the slave torque command filter 471 and gain 473, and the slave position command filter 470 and gain 469.

The output of the master position command filter can include selected maximum master position limits and minimum master position limits for each joint 231-237. The limits can be used to protect the master control arm 200A from extending further than the system is designed for. In addition, a maximum master absolute rate limit can be set that limits the rate of movement of the master control arm.

The gravity compensation torque output 412 is subtracted from the master torque measurement 406 and sent to the master torque command filter 421. The master torque command filter can be a lag lead compensator that can be used to remove high frequency signals. A lag lead filter similar to the example in FIG. 4C can be used to filter the master torque signal. The input 491 is the master torque 406 minus the GCOMP torque value 412 for the joint. A selected cross gain Kmtc 423 (FIG. 4A) for the measured torque value is applied. The values of A, B, C, and D in the transform function 493 are frequencies that are chosen for the filter. The actual selected values are dependent on the design of the system, the weight and length of each segment in the slave arm, the load on the arm, various frictional losses, and so forth. Returning to FIG. 4A, the output of the master torque command filter 421 is input to the slave torque control 460 in the slave GDC 452.

The value of the cross gain 423 applied to the gravity compensated, measured master torque is selected to provide a desired level of amplification of the torque applied by a user to the master control arm. For instance, when a user applies 5 pounds of force in a selected direction, the master torque cross gain 423 can be set such that the slave arm applies 100 pounds of force in the selected direction. Any ratio within the design limits of the system may be selected. A high ratio may be chosen for projects involving heavy lifting, thereby reducing fatigue on the user. A low level of gain may be selected for delicate operations to ensure that the slave arm does not damage fragile materials.

The filtered output of the master position command filter 420 and the master torque command filter 421 are sent to the slave position control 458 and slave torque control 460, respectively. The slave position control 458 and the slave torque control 460 each use a lag lead compensator to determine an output to the valve current control 464. The outputs of the two controls are summed 467. A lag lead compensator is selected to improve an undesirable frequency response in the feedback of the control system. The slave position control 458 uses position feedback from the position sensor 341. The slave torque control 460 uses torque feedback from the load sensor 361 on the actuator 351.

FIG. 4B provides an example of a Laplace domain transfer function block diagram for a lag lead system with derivative feedback. The desired position or torque command 490 and the measured position or torque value 492 is input. A lag lead gain value "K" is selected. Zero values "A" and "B" and pole values "C" and "D" are selected. The A and C values are the lead compensator and the B and D values are the lag compensator. The lead compensator provides a phase lead at high frequencies. This effectively shifts the poles to the left, which enhances the responsiveness and stability of the system. The lag compensator imposes a penalty of phase lag at low frequencies in order to eliminate or minimize steady state error. The actual location of the poles and zeroes depends on the desired characteristics of the closed loop response and the characteristics of the system being controlled.

A derivative of the measured position or torque value, du/dt, is calculated and filtered using the derivative filter 494. The derivative filter can be a single poll filter used to remove high frequency components. High frequency components, such as frequencies greater than 10 Hz, can be considered to be anomalous signals that could cause unwanted vibrations in the master control arm. A derivation gain 496 is then applied to the filtered signal. The output is then subtracted from the output of the transfer function 495. The output of the slave position control 458 and the slave torque control 460 is then sent to the valve current control 464, as previously discussed. The slave plant dynamics block 455 represents the physical characteristics, inputs and response of the slave arm while it is interacting with the environment.

The teleoperated robotic device may further comprise a "tap response" function that is configured to provide enhanced force feedback to the operator through the master control arm when the slave arm contacts an object to enable the operator to sense more accurately the point at which the slave arm makes contact with an object. Tap response can vary with the amplitude of the slave load derivative, for example, the rate of change of torque as sensed by a load sensor, thus giving the operator a sense of the magnitude of the impact event at the slave arm with a "tap" to simulate touch. The slave load derivative response may be too short in duration for a person to sense and/or the response may exceed the ability of the system to accurately reproduce. Therefore, the slave load derivative can be passed through a filter to convert the slave load derivative to a slower response that a person can feel and that the system can reproduce.

The slave torque command filter 471 can receive the slave load derivative and pass it through a gained two-pole, two-zero filter as illustrated in FIG. 4C. In this case, the input 491 is the slave torque derivative. A gain is applied as represented by the value "K". Zero values "A" and "B" and pole values "C" and "D" are selected for the filter 493. The filter output can be applied as a torque command to the master control arm DOF, where it is sensed by the user. This feature can enhance the accuracy of the "feel" at the master control arm of resistance encountered by the slave arm and can help the operator better recognize that the slave arm has made contact with an object. In one aspect, tap response can be applied to any of the degrees of freedom of the master control arm. In a specific aspect, tap response is applied only to the wrist degrees of freedom of the master control arm.

It should be understood that in the embodiment shown in FIG. 3A, a separate GDC 371-377 (FIG. 3A) is coupled to each joint providing a DOF in the slave arm 300A. Each support member can have different characteristics, such as size, mass, and center of gravity. Thus, different filter values and different gains for the lag lead filter in the slave position control 458 and slave torque control 460 can be selected for each joint based on the physical characteristics of the support member connected to the joint, its natural resonant frequency, its location in the master control arm, and other design characteristics, as can be appreciated.

The signals sent to the valve current control 464 from the slave position control 458 and the slave torque control 460 can be controlled using a Proportional-Integral-Derivative (PID) controller that uses current feedback 468. The PID controller takes into account a rate of change of an error between the desired level of valve current and the actual valve current. This difference is referred to as the error. If the measured value approaches the desired level rapidly, then the rate of change in the valve used to control the current flow is backed off early to allow it to coast to the required level. Conversely, if the measured value begins to move rapidly away from the desired level, an extra effort is applied to try to maintain the desired level. In addition, an integral term is used to magnify the effect of long-term steady-state errors. An ever-increasing effort can be applied until the error level approaches zero. The output of the PID controller in the valve current control 464 is sent to the valve 381 to provide the desired level of hydraulic fluid to apply a force to the actuator 351. In response, the actuator 351 will move the joint 331 to the desired position with the desired level of torque.

The position and torque of each joint 331-337 on the slave control arm 300A is similarly updated. The slave position 454 and the slave torque 456 for each of the joints 331-337 is communicated from the slave GDC 452 to the master GDC 402 for each joint in the slave arm. The signals may be directly communicated from each slave DOF for joints 331-337 to the corresponding master DOF for joints 231-237 on the master arm 200A. Alternatively, each of the slave DOFs and master DOFs may be in communication with the central controller. The central controller can be used to direct communications between the GDCs, as previously discussed.

The measured slave position 454 of the joint 331 can be output to a slave position command filter 470. The slave position command filter can be a lag lead compensator that can be used to remove high frequency signals and improve stability margins. The generic filter illustrated in FIG. 4C can represent one example of a transfer function used for lag lead filtering of the signal. The input 491 is the measured slave position 454. A selected cross gain Kspc 469 (FIG. 4A), as represented by the value "K" for the measured slave position is applied. The values of A, B, C, and D in the transform function 493 are frequencies that are chosen for the filter. The actual selected values are dependent on the design of the system, the weight and length of each segment in the slave arm, the load on the arm, various frictional losses, and so forth. Returning to FIG. 4A, the output of the slave position command filter 470 is input to the master position control 408 in the master GDC 402. Similarly, lag lead filtering can be applied to slave arm torque, master control arm torque, and master control arm position signals. Such filtering can occur locally for a DOF and/or at a system level to filter signals propagating through the platform, such as between the master control arm and the slave arm.

In some exemplary embodiments, the teleoperated robotic system of the present invention may further comprise a master/slave relationship filtering function, or relationship filtering function, that addresses the problems relating to unwanted movements in the robotic system, such as those introduced by the mobile platform. For instance, the master/slave relationship filtering function addresses the problem where the master is caused to move differently than the desired input of the operator, which in turn causes the slave to move in an undesired way. In the particular situation where the user, the master control arm, and the slave arm are commonly supported about the same mobile platform, the master/slave relationship filtering function is useful to identify and filter frequencies resulting from undesirable movements of the master control arm and slave arm to reduce motion feedback. The master/slave relationship filtering function deals with an unwanted feedback loop created in the system. If left unchecked, oscillations in the system can continue and grow in amplitude. By understanding which frequencies at which an unwanted feedback loop occurs, it can essentially be broken and its impacts on the overall performance of the robotic system can be reduced or eliminated.

There are various ways in which the problem of unwanted movements in the master control arm (i.e., movements different from those resulting from the desired inputs from the user) that cause the slave arm to move in an undesirable way can occur. In one example, the user moves the master control arm and the master control arm oscillates at the master structural mode. In another example, the user moves the master control arm and the user oscillates at the "operator support structural mode" of the platform the user stands on. In another example, the slave arm moves or oscillates, which causes a sympathetic oscillation in the mobile platform, which in turn results in an oscillation in the user platform and/or the master stand. In still another example, the slave arm interacts with the environment that causes a sympathetic oscillation in the mobile platform, which in turn results in an oscillation in the user platform and/or the master stand.

Since the structural mode oscillations of the mobile platform, the slave arm and the environment can occur within the desired robot operating envelope, cross commands can be filtered to minimize the oscillations resulting from coupling between master support modes and slave support and environment modes, as communicated through the mobile platform. The relationship filtering function dampens out oscillations at the identified structural mode frequencies by reducing the gain of the commands at those frequencies and minimizing the overall delay of the system's ability to reject these oscillations by introducing a phase lead at those frequencies, which reduces lag and increases stability margins.

In a similar manner in embodiments implementing a torque assistance function, the torque assistance commands can be filtered to minimize the oscillations resulting from coupling between the operator modes and the master modes.

Applying the master/slave relationship filtering function may induce delays at frequencies lower than the structural mode being targeted, resulting in decreased performance over some of the performance envelope in order to maintain stability and achieve higher position accuracy. The stability and accuracy of the teleoperated robotic system can allow the user to perform tasks that approach "human speed" instead of being limited to slower "robot speed" that is typical of less stable and less accurate teleoperated robotic systems, which can result in increased productivity.

The gravity compensation torque output 462 is subtracted from the measured output of the slave torque 456 and sent to the slave torque command filter 471. The slave torque command filter can be a lag lead compensator that can be used to remove high frequency signals and improve stability margins. A lag lead filter similar to the generic filter example in FIG. 4C can be used to filter the master torque signal. The input 491 is the slave torque 456 minus the GCOMP slave torque value 462 for the joint. A selected cross gain Kstc 473 (FIG. 4A), represented by the value "K" for the measured torque value is applied. The values of A, B, C, and D in the transform function 493 are frequencies that are chosen for the filter. The actual selected values are dependent on the design of the system, the weight and length of each segment in the slave arm, the load on the arm, various frictional losses, and so forth.

The output of the slave position command filter 470 can include selected maximum slave position limits and minimum slave position limits for each joint 331-337. The limits can be used to protect the slave arm from extending further than the system is designed for. The maximum and minimum limits can be dependent on the load carried by the slave arm. The heavier the load, the more force is applied to the various components in the slave arm. When the arm is fully extended, the force can be at a maximum. In addition, extending the load can change the center of mass. To limit the amount of force to safe levels for the arm, and maintain the center of mass of the system 100 at a location that can minimize tipping the base over, the distance from the base at which the slave arm can extend can be limited based on the weight of the load. The weight of the payload can be measured based on the torque at each joint of the slave arm. Alternatively, an end effector can include a digital scale that can be used to accurately weigh the load as it is picked up. The slave arm can be configured to only pick up loads that are less than a maximum weight.

Maximum weight loads may be limited to being extended a distance that is relatively close to the base 400 (FIG. 1), while relatively light weight loads may be extended the full distance of the slave arm. Feedback to the master arm can apply a torque to the associated joints in the master arm when the maximum distance has been reached, enabling the user to know that the arm cannot be extended further. In addition, a maximum slave absolute rate limit can be set that limits the rate of movement of the slave arm.

The minimum and maximum position limits on the master and slave can also be used to provide operator restrictive controls that provide workplace protection. Operator restrictive controls can be used to adjust the ability of the operator to control the slave arm. The controls may vary from 100% operator controlled, to 0% operator controlled, wherein the robot is completely autonomous. In certain situations, the master control arm and/or the slave arm can be restricted to enable the robot to perform selected tasks. For instance, the slave arm may be used to hold a cutting torch to cut a heavy piece of metal in a predetermined pattern. The user may pick up the piece of metal with a first slave arm 300A and perform the weld with the second slave arm 300B. A graphical user interface (not shown) can be used to allow the user to instruct the system to perform the desired weld. The user's ability to control the second slave arm 300B and/or the second master control arm 200B may be limited in order to achieve the desired weld. The limits may be set on the position of the control arm and/or slave arm, the rate of movement of the control arm and/or slave arm, and the amount of force that can be applied to the control arm or by the slave arm. The actual path may be configured to restrict movement along a complicated path in the X, Y, and Z axes. The rate of movement of the slave arm 300B may be set to limit maximum velocity of the slave arm to a speed that allows the metal to be welded. Similar maximum and minimum limits can be applied to the master torque command filter 421 and the slave torque command filter 471 to limit the amount of torque that can be applied by the controller. For instance, the position limits may be set to limit the movement of slave arm 300B to moving along an X axis from a first position to a second position. Once the weld is completed, the graphical user interface can be used to reset the operational abilities of slave arm 300B to allow a full range of motion, speed, and torque that are within the system limitations. The position and rate limits can also be used to apply safety interlock settings in desired circumstances to keep the arms from approaching set boundaries, as can be appreciated.

In addition to placing limits on the movements, torque, and rate of movement of the master control arms 200A, 200B and the slave control arms 300A, 300B, the system 100 can be configured to perform fully automated functions. Using the graphical user interface, or another type of data input device, a program can be entered to a programming module that instructs at least one of the master control arms and/or the slave arms to move along a predetermined path. The programming module can be in communication with the central controller 401, or another processor that is in communication with the central controller. The central controller can pass the programming information to the GDCs 450, 452. In one example, a user may place the system 100 in front of a palate of sheet metal that needs to be unloaded. The system can be configured to use an end effector to pick up the sheet metal and place it in a new location without any assistance by the user. In addition, other actions such as welding along a predetermined path at a predetermined rate can be performed in a fully automated mode.

Any function that can be performed using the system 100 in a manual mode can also be performed in an automated mode. In one example, the system can be programmed to operate in a fully automated mode by recording the user's actions while the user operates the system in a manual mode. For instance, the user may record the act of picking up the sheet metal and placing it at a new location the first time the action is performed. The system can then be placed in a fully automated mode to continue to perform that same action until all of the sheet metal on the palate has been moved. Alternatively, traditional programming methods may be used to instruct the system to perform desired actions.

Automation programming may be configured to either control the master control arm, which can then control the slave arm, as previously discussed. Alternatively, the automation programming can be configured to control the slave arm in a fully automated manner. When the slave arm is programmed to operate in a fully automated mode, the force feedback can still be sent to the master control arm. This can enable a user to feel the movements of the slave arm, thereby providing an additional sense to allow the user to determine that the system is functioning correctly.

In another example, the system 100 (FIG. 1) can be operated in an environment with a ceiling that is lower than the maximum reach of the slave arms 300A, 300B. The maximum height that the slave arms can reach can be limited to be lower than a height of the ceiling. The system can be similarly programmed to provide workplace protection. The limitations may be set over the entire area, or dependent on the system being at a selected location within the environment.

The system 100 can be used in a fully manual mode, a fully automated mode, or a semi-automated mode as conditions require. This enables the slave arm on the system to be used to perform the actions that it does best, while enabling a user to assist at any time, thereby enabling complex tasks or one time tasks to be performed with the assistance of the user rather than requiring hours of programming, while enabling the system to perform repeated tasks to minimize user fatigue.

Returning to FIG. 4A, the output of the slave torque command filter 471 is added to the output of the GCOMP master signal 412 and further added to the output of the master torque assist control output 413, with the summed value input to the master torque control 470 in the master GDC 402. The output of the slave torque command filter 471 can be used to provide force feedback to the master control arm 200A. The cross gain applied to the gravity compensated, measured slave torque 473 can be adjusted to provide a desired level of feedback at the master control arm. By subtracting out the effect of gravity, the feedback can be limited to the loads on the slave arm that are due to loads being carried by the arm, inertial loads, and/or environmental impacts. For example, the cross gain may be set such that a user feels 2.5 pounds at the master control arm 200A for every 100 pounds that is lifted by the slave arm 300A. The actual amount of force feedback can be selected based on the design of the system and the job being performed by the user and the robot to provide the user with a sufficient level of tactile feedback to improve the user's performance, while not hindering the user's performance through fatigue or other forms of stress.

The slave torque command filter 471 can be configured to amplify transient signals and send them as force feedback. Transient signals may be caused when an abrupt change in velocity occurs, such as when the slave arm strikes a surface or an object. This transient signal can be amplified and provide a high, momentary torque level to each associated joint in the control arm. This enables a user to quickly determine that the slave arm contacted a surface and respond accordingly. The kinematic design of the system enables the user to reflexively and appropriately respond to a collision or other type of interaction at the slave arm which may cause.

In one embodiment, the slave arm 300A can be manually moved by a user by applying a pressure to the slave arm to move it in a desired direction. The load can be detected at each joint 331-337 by the load sensors 361-367 and output as a slave torque value 456. The slave torque value can be communicated to the valve current control 464 and used to apply a force to one or more of the actuators 351-357 to move the slave arm in the desired direction, thereby assisting the user to move the slave arm. The assistance can greatly enhance the user's ability to move the slave arm, especially when a heavy load is being lifted.

In addition, a slave load cell interface 457 can be coupled to the slave arm. In one aspect, the slave load cell interface can function similarly to the operator load cell interface 407, as previously described. The user can apply a load to the load cell interface that is translated to a load value in multiple DOF. The load value can be communicated from the interface to the slave load control 463, which can scale the torque values sufficient to assist the user to move the slave arm. Typically, the torque values applied are insufficient to move the slave arm without assistance from the user. The torque values for each joint 331-337 associated with one of the DOF of the load cell 457 can be summed with the torque outputs of the GCOMP slave 462 and the torque from the slave torque 456. The torque values can assist the user in moving the slave arm in a direction indicated by the user through the multi DOF load cells. In another, aspect, the slave load cell interface 457 can comprise a load cell disposed proximate to the end effector to sense loads acting on the slave arm from the end effector and any associated payload. The loads can be communicated to the slave load control 463, which can apply payload stabilization, weight correction, and payload g-comp, as discussed herein, or any other type of control that may be beneficial to the user while operating the slave arm. Any number of slave load cell interfaces may be used at any location on the slave arm.

A payload coupled to the end effector 390 can be stabilized by utilizing load sensor 368, which is associated with the end effector at the end of the slave arm. Load sensor 368 can measure forces and moments produced by a payload and acting on load sensor 368. Using the slave load control module 463, payload stabilization can be applied to several different payload scenarios including a swinging payload, a rigid payload coupled to a pair of magnetic end effectors in a "two-handed" lift, and a fragile payload or operating environment.

Figure 4E:
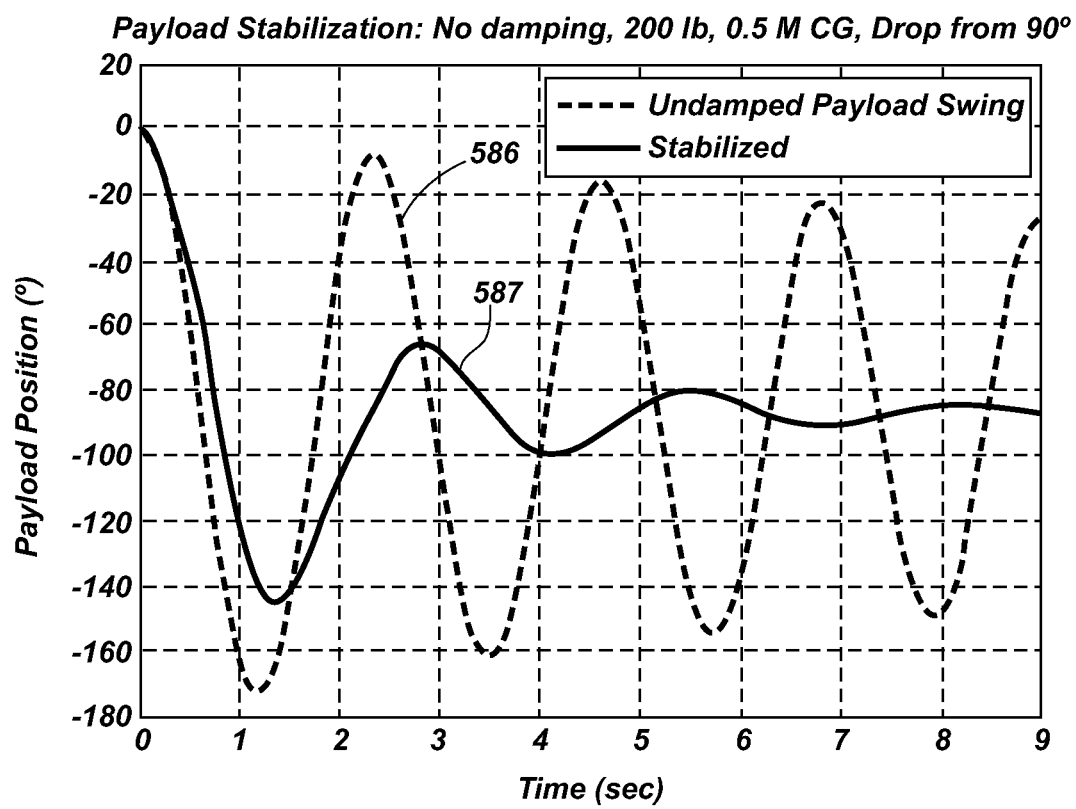
FIG. 4E is a plot comparing a swinging payload with and without payload stabilization.

In the case of a swinging payload, it is desirable to reduce swinging quickly to minimize negative effects of an unstable payload. Based on the measured information from the load sensor 368, torque is applied at the slave arm DOF to minimize force components exerted by the payload that are perpendicular to gravity. This has the effect of moving the end effector so that the payload center of gravity is below the end effector. The swinging of the payload is taken up and eliminated quickly by the countering movements of the slave arm. A graphic comparing a swinging payload with and without payload stabilization is illustrated in FIG. 4E. Plot 586 is without payload stabilization and plot 587 is with payload stabilization.

In the case of a rigid payload coupled to a pair of end effectors (e.g., magnetic) in a "two-handed" lift, it is possible for the operator controlled slave arms to fight one another such that one or both of the magnetic end effectors twist away from the rigid payload. This twisting can reduce the magnetic hold on the payload potentially resulting in a drop of the payload. With payload stabilization, load sensor 368 detects the forces and moments threatening to twist the end effector relative to the payload. Upon detection, the slave arms are caused to move to relieve or minimize forces and moments threatening to twist the magnetic end effectors from the payload. In one aspect, the load at the end of the slave arm can be limited to a predetermined value and the slave arms can move to maintain the applied load at or below the predetermined value.

In the case of a fragile payload or operating environment, it may be desirable to limit the amount of force the end effector can apply to a payload or other object, as detected by the load sensor 368. With payload stabilization, the slave arm can reduce or eliminate forces and moments when they exceed a predetermined value to maintain forces and moments at or below the predetermined value.

Figure 5:
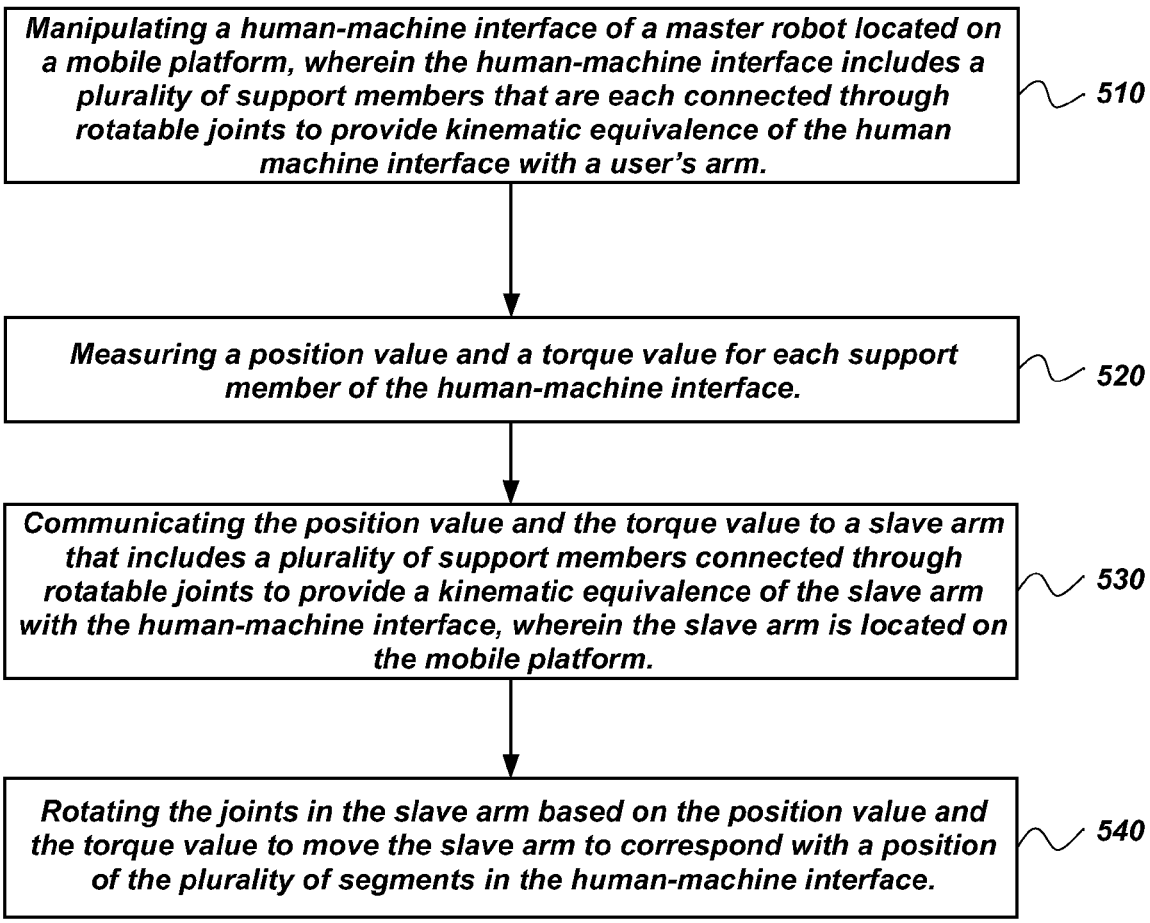
FIG. 5 depicts a flow chart of a method for controlling a tele-operated robot arm in accordance with an embodiment of the present invention.

In accordance with one embodiment of the present invention, a method for controlling a tele-operated robot arm is disclosed, as depicted in the flow chart of FIG. 5. The method comprises manipulating 510 a human-machine interface of a master robot located on a mobile platform. The human-machine interface includes a plurality of support members that are each connected through rotatable joints to provide kinematic equivalence of the human-machine interface with a user's arm. Another operation provides measuring 520 a position value and a torque value for each support member of the human-machine interface. Moreover, a master/slave relationship filtering function can provide for electronic filtering of movements of the human-machine interface that are induced by movements in the slave arm on the mobile platform so as to reduce motion feedback in the slave arm, as discussed above.

The method further comprises communicating 530 the position value and the torque value to a slave arm that includes a plurality of support members connected through rotatable joints to provide a kinematic equivalence of the slave arm with the human-machine interface. The slave arm is also located on the mobile platform. A further operation provides rotating 540 (or otherwise manipulating) the joints in the slave arm based on the position value and the torque value to move the slave arm to correspond with a position of the plurality of segments of the human-machine interface.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for controlling a tele-operated robot arm, comprising:
   manipulating a human-machine interface of a master robot located on a mobile platform, wherein the human-machine interface includes a plurality of support members that are each connected through rotatable joints to provide kinematic equivalence of the human-machine interface with a user's arm;

measuring a position value and a torque value for each support member of the human-machine interface; and communicating the position value and the torque value to a slave arm that includes a plurality of support members connected through rotatable joints to provide a kinematic equivalence of the slave arm with the human-machine interface, wherein the slave arm is located on the mobile platform;

rotating the joints in the slave arm based on the position value and the torque value to move the slave arm to correspond with a position of the plurality of segments in the human-machine interface;

selectively manipulating the master robot and the mobile platform from a user operating area situated about the mobile platform and;

electronically filtering movements in the human-machine interface that are induced by movements in the slave arm on the mobile platform to reduce motion feedback in the slave arm.

2. The method of churn 1, further comprising selecting operating frequencies for the plurality of support members of the slave arm to limit resonance of the support members at natural frequencies of the support members in the mobile platform.

3. The method of claim 1, further comprising filtering the position value and the torque value using a compensator to improve a response of the position value and the torque value sent to the slave arm.

4. The method of claim 1, further comprising providing a feedback of a slave torque value and a slave position value for each support member in the slave arm to the human-machine interface based on at least one interaction of the slave arm with an environment.

5. The method of claim 4, further comprising conveying a force feedback to the user of the slave arm's interaction with the environment through the human-machine interface based on the slave torque value and the slave position value for each support member in the slave arm communicated to a corresponding support member of the human-machine interface.

6. The method of claim 5, further comprising filtering the slave torque value and the slave position value using a compensator to improve a response of the slave position value and the slave torque value sent to the master control arm to provide the force feedback.

7. The method of claim 5, further comprising actuating the rotatable joints of the corresponding support members of the human-machine interface based on the slave torque value and the slave position value for each segment in the slave arm to provide a desired level of force feedback at the human-machine interface.

8. The method of claim 5, further comprising gravity compensating the slave arm such that a torque value on each support member of the slave arm that is caused by gravity is substantially not communicated to the human-machine interface in the force feedback.

9. The method of claim 1, further comprising gravity compensating and load compensating the slave arm such that a force value on each support member of the slave arm that is caused by gravity and the load is balanced with a. substantially equal force applied to the support members in an opposite direction of a measured gravity vector.

10. The method of claim 9, further comprising manually moving the slave arm and the load by applying a force in a selected direction directly to the gravity compensated and load compensated slave arm and adding an additional force value in the selected direction to move the slave arm in the selected direction, wherein the additional force is provided by one of an electric motor, a hydraulic actuator, and a pneumatic actuator.

11. The method of claim 1, further comprising gravity compensating the human machine interface to substantially reduce a weight of the human machine interface to the user.

12. The method of claim 1, further comprising gravity compensating the human machine interface and a weight of the user's arm at the human machine interface to reduce fatigue on the user.

13. The method of claim 1, further comprising limiting a range of movements of the slave arm to enable the slave arm to move over a selected path while restricting the master robot.

14. The method of claim 13, wherein the slave arm is further limited to move over the selected path at a selected velocity.

15. The method of claim 13, wherein the slave arm is further limited to move over the selected path with a selected amount of force.

16. The method of claim 1, further comprising selecting filter values for cross torque and cross position filters to limit resonance at a natural frequency of each support member in the human-machine interface and the slave arm.

17. The method of claim 1, further comprising manipulating the human-machine interface of the master robot by programming the human-machine interface to at least one of move to a desired location, move at a desired rate of speed, and apply a predetermined level of torque.

18. The method of claim 1, further comprising moving the slave arm to minimize a load perpendicular to gravity applied at an end of the slave arm.

19. The method of claim 1, further comprising limiting a load applied at an end of the slave arm.

20. The method of claim 1, further comprising locking a rotatable joint of the slave arm.

21. A computer program product, comprising a non-transitory computer usable medium having a computer readable program code embodied therein, said computer readable program code adapted to be executed to implement a method for controlling a tele-operated robot system, comprising:

measuring a force value and a position value at each rotational joint of a human-machine interface having a plurality of support members connected by rotational joints that are arranged to provide a kinematic equivalence of the human-machine interface with a human am, wherein the human machine interface is located on a mobile platform;

applying a force corresponding to the force value and the position value to each corresponding support member of a slave arm located on the mobile platform, wherein the mobile platform has a same number of support members connected by rotational joints as the human-machine interface, the applied force moving the support members of the slave arm to a position substantially similar to the support members of the human-machine interface;

monitoring movement induced in the human-machine interface by the movement of the support members of the slave arm; and filtering force values and position values caused by the induced movement of the support members to reduce a feedback to the slave arm.

* * * * *